US012702962B2

(12) United States Patent
Donahue et al.

(10) Patent No.: US 12,702,962 B2
(45) Date of Patent: Aug. 11, 2026

(54) METERING HOPPERS AND RELATED METHODS

(71) Applicant: Massachusetts Institute of Technology, Cambridge, MA (US)

(72) Inventors: Mark Donahue, Littleton, MA (US); Eric Morgan, Harvard, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 17 days.

(21) Appl. No.: 19/009,928

(22) Filed: Jan. 4, 2025

(65) Prior Publication Data

US 2026/0116733 A1 Apr. 30, 2026

Related U.S. Application Data

(60) Provisional application No. 63/618,267, filed on Jan. 5, 2024.

(51) Int. Cl.
*B67C 11/00* (2006.01)
*B67C 11/04* (2006.01)

(52) U.S. Cl.
CPC ........... *B67C 11/04* (2013.01); *B67C 2011/20* (2013.01)

(58) Field of Classification Search
CPC ............... B67C 11/04; B01J 8/12; B65B 1/03
See application file for complete search history.

(56) References Cited

U.S. PATENT DOCUMENTS

| | | | | |
|---|---|---|---|---|
| 4,033,730 | A * | 7/1977 | Baron | B01J 3/02 48/77 |
| 9,340,419 | B2 | 5/2016 | Kim et al. | |
| 10,745,789 | B2 | 8/2020 | Slocum | |
| 10,998,562 | B2 | 5/2021 | Stimits et al. | |
| 11,661,339 | B1 | 5/2023 | Mahar et al. | |
| 2012/0000934 | A1* | 1/2012 | Ulstad | A47J 31/404 141/2 |
| 2016/0190608 | A1 | 6/2016 | Ueda | |
| 2017/0144125 | A1 | 5/2017 | Vyas et al. | |
| 2020/0199728 | A1 | 6/2020 | Slocum | |
| 2020/0280084 | A1 | 9/2020 | Stimits et al. | |
| 2021/0246020 | A1 | 8/2021 | Sahu et al. | |
| 2021/0269306 | A1 | 9/2021 | Fischman et al. | |

(Continued)

OTHER PUBLICATIONS

Fischman et al., Hydrogen generation via the reaction of an activated aluminum slurry with water. Int J Hyd Ene. Jul. 10, 2020;45(35):17118-30. doi: 10.1016/j.ijhydene.2020.04.161.

(Continued)

*Primary Examiner* — Timothy P. Kelly
(74) *Attorney, Agent, or Firm* — Wolf, Greenfield & Sacks, P.C.

(57) ABSTRACT

The present disclosure relates to improved metering hoppers for dispensing solid materials, particularly in the context of metered dispensation of solid pellets to feed reactors, in addition to associated methods, systems, and apparatuses. The disclosure relates, in various embodiments, to shielded metering hoppers configured to control the flow of solid material to a feed slot. In some cases, the disclosure relates to pressurized metering hoppers suitable for dispensing solid fuel into gas-generating reactors. Accordingly, the disclosure also relates to pressurized metering hoppers for solid materials, according to some embodiments.

21 Claims, 14 Drawing Sheets

(56) References Cited

U.S. PATENT DOCUMENTS

| | | | |
|---|---|---|---|
| 2021/0316987 A1 | 10/2021 | Fischman et al. |
| 2022/0041262 A1 | 2/2022 | Slocum et al. |
| 2022/0203437 A1 | 6/2022 | Morgan et al. |
| 2023/0002026 A1 | 1/2023 | Limpaecher et al. |

OTHER PUBLICATIONS

Godart et al., Hydrogen production from aluminum-water reactions subject to varied pressures and temperatures. Int J Hyd Ene. May 3, 2019;44(23):11448-58. doi: 10.1016/j.ijhydene.2019.03.140.

Hurtubise et al., Development and demonstration of a deployable apparatus for generating hydrogen from the hydrolysis of aluminum via sodium hydroxide. Int J Hyd Ene. Apr. 5, 2018;43(14):6777-88. doi: 10.1016/j.ijhydene.2018.02.087.

* cited by examiner

METERING HOPPERS AND RELATED METHODS

RELATED APPLICATIONS

This application claims priority under 35 U.S.C. § 119(e) to U.S. Provisional Application No. 63/618,267 filed Jan. 5, 2024, which is incorporated herein by reference in its entirety for all purposes.

GOVERNMENT LICENSE RIGHTS

This invention was made with government support under FA8702-15-D-0001 awarded by the U.S. Air Force. The government has certain rights in the invention.

TECHNICAL FIELD

Disclosed embodiments are related to metering hoppers for controlled dispensation of solid materials, particularly in the context of metered dispensation of solid materials including, in some embodiments, water-reactive solid materials such as solid pellets to feed gas generating reactions.

BACKGROUND

Hydrogen gas has been well recognized as an emission-free fuel holding promise for a more sustainable energy economy compared to fossil fuels. Oxidation-reduction reactions involving metals can produce hydrogen on-demand, eliminating the cost and safety concerns of storing hydrogen as a gas or liquid at high-pressure. Aluminum (Al), for example, has an energy density about two times greater than diesel fuel and forty times greater than lithium ion, and reacts with water to produce hydrogen. While metering the flow of solid materials (e.g., dispensing water reactive materials into water within a hydrogen reactor) may be desirable in a number of applications, metering of solid materials such as activated aluminum presents an array of unique challenges.

SUMMARY

The present disclosure relates to improved metering hoppers for dispensing solid materials, particularly in the context of metered dispensation of solid pellets to feed reactors, in addition to associated methods, systems, and apparatuses. The disclosure relates, in various embodiments, to shielded metering hoppers configured to control the flow of solid material to a feed slot. In some cases, the disclosure relates to pressurized metering hoppers suitable for dispensing solid fuel into gas-generating reactors. Accordingly, the disclosure also relates to pressurized metering hoppers for solid materials, according to some embodiments.

In one embodiment, a metering hopper includes a hopper configured to store solid pellets, an outlet disposed in a bottom portion of the metering hopper with respect to local gravity during operation, a feed slot configured to gravity-feed the solid reactant pellets to the outlet, a feed slot cover including a receiver slot configured to move between a closed configuration where the receiver slot is out of alignment with the feed slot and an open configuration where the receiver slot is aligned with the feed slot, and a shield configured to block the solid pellets from falling directly into the feed slot.

In another embodiment, a method of dispensing solid pellets from a metering hopper includes moving a receiver slot from a closed configuration out of alignment with a feed slot to an open configuration aligned with the feed slot to feed a portion of the solid pellets into the feed slot, flowing the portion of the solid pellets from the feed slot through an outlet of the metering hopper, and shielding the feed slot from the solid pellets falling directly into the feed slot.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1:
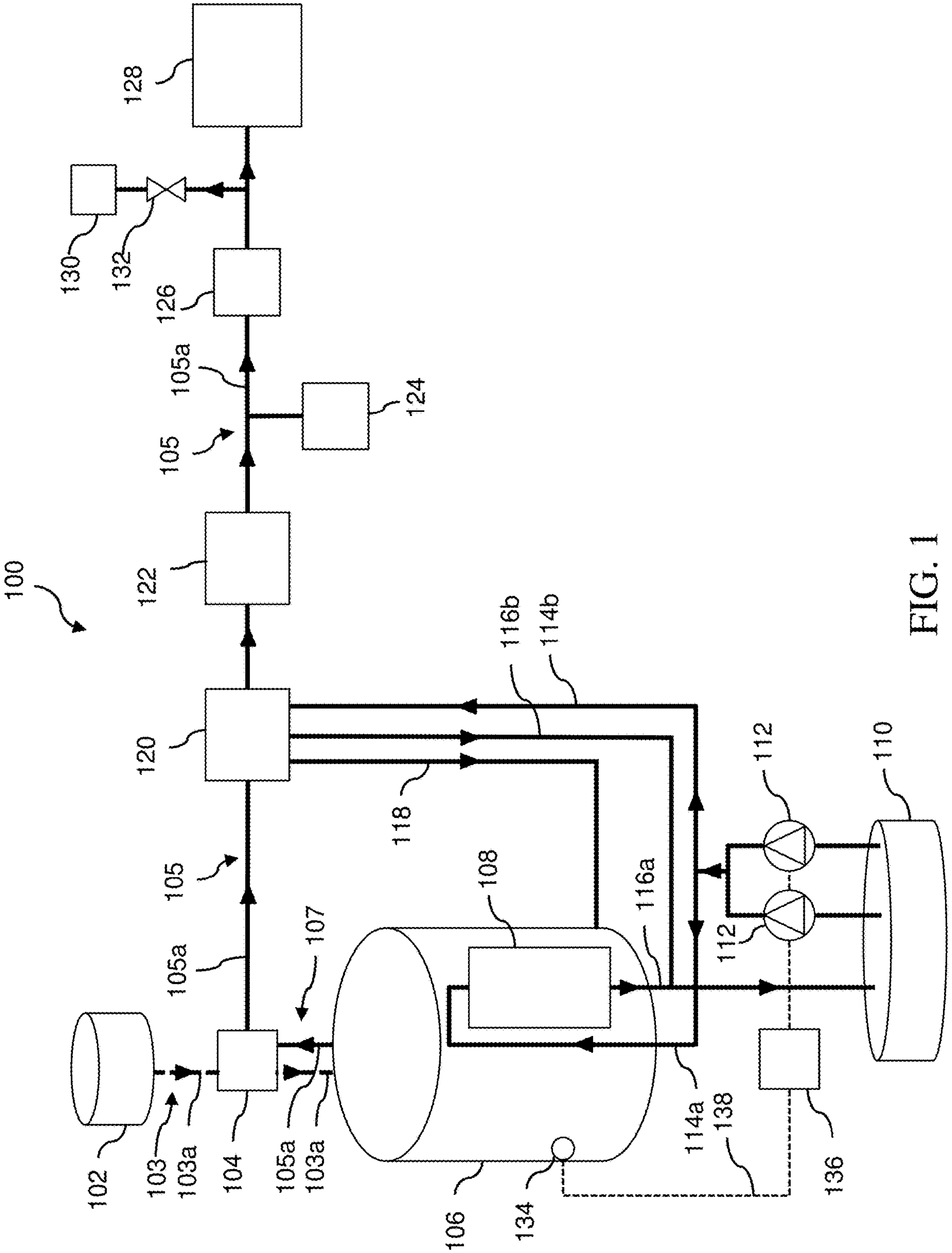
FIG. 1 presents a schematic of a hydrogen reactor including a non-limiting metering hopper, according to some embodiments.

The present disclosure provides, in various aspects, to metered dispensation of solid materials. Metered dispensation of solid materials (e.g., repeated dispensation of solid materials in relatively consistent quantities), and especially of solid materials such as activated aluminum, produces a number of unique challenges that do not arise in other types of dispensers. For example, solid materials tend to pile up, e.g., by forming solid bridges that impede the flow of the solid materials through a dispenser and reduce the consistency of metered flow. Another challenge of dispensing solid materials involves the "chute-through" of solid materials bypassing the metering mechanism and reducing dispensation consistency. These problems can be compounded by the irregularity of the solid material. For example, solid pellets may be more resistant to flow than fine, round-grained powders. Additionally, metering of hard solid materials, such as activated aluminum or other hard materials, may lead to jamming within typical metering systems due to the inability to shear through the material as may occur in metering of other softer solid materials. Furthermore, another challenge that may be present are elevated temperatures and pressures associated with some reactors. Thus, dispensing solid pellets in a metered fashion can present a particularly unique set of complexities.

Nonetheless, metered delivery of solid materials like pellets has significant technological advantages, particularly in the context of reactor systems reliant upon the reaction of the solid materials, which may oftentimes be provided in pellet form. For example, in some embodiments, it may be advantageous to meter the delivery of water reactive materials into a reactor, (e.g., in order to produce hydrogen). The hydrogen may be generated as a gas—and the reaction may produce gaseous physical or chemical byproducts like steam produced as the result of heat generation in a reactor. Thus, according to some embodiments, the disclosure relates to metered delivery of solid materials (e.g., water reactive solid materials) in a high pressure hydrogen reactor.

High pressure reactors pose a unique set of difficulties related to metered delivery of solid materials. For example, while a hopper may be used to dispense the solid material to the reactor, sealing the reactor (to contain the pressurized hydrogen and water released by the reaction) while allowing metered actuation of the metering hopper can pose unique challenges. Another complexity involves positioning the metering components within the metering hopper—components suitable for metering the flow of the solid material through the metering hopper can be difficult to assemble within a pressure vessel without introducing structural weaknesses that could compromise the vessel's performance. Pressure vessels ordinarily have small openings (e.g., no more than 15-20% of the diameter of the pressure vessel) in order to minimize the occurrence of leakage and decompression. However, assembling metering components within the pressure vessel to regulate the flow of a solid material may be challenging. Additionally, even if the solid material is pelletized (rather than, e.g., in powder form), hopper components can be damaged by powder formed during the loading and/or dispensation of the metering hopper, since those processes can erode solid pellets to form powders that can compromise mechanical components of the metering hopper.

Another unique challenge of hydrogen reactors is the physical properties of their solid fuel. For example, in some embodiments, it is desirable to feed a hydrogen reactor with reactive aluminum, as discussed in greater detail below. However, aluminum pellets are denser than many other solid materials (e.g., organic materials), and can consequently damage conventional metering hopper components such as brushes, wiper arms, and traditional valve based metering hoppers. Specifically, the weight and hardness of the aluminum can cause shear damage to these components and/or can jam them, rendering them inoperable.

In view of the above, the present disclosure provides, in various aspects, hoppers that provide highly controlled metering of solid materials (e.g., aluminum pellets) while overcoming various combinations of the challenges identified in the preceding paragraphs. Systems, methods, and apparatuses herein may provide for the metered, gravity fed dispensation of pelletized solid materials without shearing or jamming. This may be particularly advantageous for higher strength materials such as metallic pellets. In some embodiments, the disclosure provides a hopper with a rotating valves configured to dispense a consistent mass of material with each revolution of the rotating valve. In some embodiments the disclosure relates to apparatuses and methods for the prevention of problems associated with pellet chute-through.

In some embodiments, the feed slot cover may be actuated between the open configuration and the close configuration using a mechanical actuator (e.g., a motor) operatively coupled to the feed slot cover. For example, in some embodiments, the metering hopper comprises a drive shaft coupling the motor to the feed slot cover so that the motor can rotate the feed slot cover to open or close it. In some embodiments, the motor is external to the metering hopper, wealthy drive shaft is internal to the metering hopper.

In some embodiments, the metering hopper is configured to be pressurized. For example, the metering hopper may comprise a tank (e.g., which may act as the hopper of the metering hopper) that is configured to be pressurized (e.g., to retain hydrogen produced by a hydrogen reactor). In some embodiments, the metering hopper is configured to be pressurized to a pressure of greater than or equal to 3,500 kPa, greater than or equal to 7,000 kPa, greater than or equal to 10,500 kPa, greater than or equal to 14,000 kPa, greater than or equal to 17,500 kPa, greater than or equal to 21,000 kPa, greater than or equal to 24,500 kPa, greater than or equal to 28,000 kPa, or greater than or equal to 31,500 kPa. In some embodiments, the metering hopper is configured to be pressurized to a pressure of less than or equal to 35,000 kPa, less than or equal to 31,500 kPa, less than or equal to 28,000 kPa, less than or equal to 24,500 kPa, less than or equal to 21,000 kPa, less than or equal to 17,500 kPa, less than or equal to 14,000 kPa, less than or equal to 10,500 kPa, or less than or equal to 7,000 kPa. Combinations of these ranges are also possible (e.g., greater than or equal to 3,500 kPa and less than or equal to 35,000 kPa, or greater than or equal to 7,000 kPa and less than or equal to 28,000 kPa). Other ranges, both higher and lower than those described above, are also possible, as the disclosure is not so limited. It should, of course, be understood that the hopper may be non-pressurized or may be configured to operate at vacuum pressures, depending on the embodiment, as the disclosure is not so limited.

Pressurized metering hoppers can present technical challenges, particularly when the metering hopper is configured to supply solid material to a pressurized reactor in fluidic communication with the metering hopper. For example, where a drive shaft is used to actuate the feed slot cover, the pressure differential between the tank of the metering hopper and the motor can create substantial thrust forces on the drive shaft that would impair performance of the motor (and thus limit consistency of the metered dispensation of solid material). Typically, these thrust forces must be matched using large, powerful actuators (e.g., motors), but it would be advantageous, according to at least some embodiments, to avoid that requirement in order to allow for smaller-scale, more inexpensive pressurized hoppers.

Accordingly, in some embodiments, the metering hopper is configured to support the drive shaft using one or more thrust bearings configured to transfer the thrust force of the drive shaft to the pressure vessel itself. In some embodiments, the metering hopper comprises a pass-through that allows the drive shaft to couple to an external actuator without compromising the pressure of the metering hopper. The thrust bearings may support the load of the drive shaft, and the pass-through may be sealed with one or more appropriate seals (e.g., shaft seals, gland seals) for maintaining the pressure of the tank. These features may facilitate external actuation of the feed slot cover with less powerful actuators (e.g., less powerful motors), depending on the embodiment. For example, in some embodiments, the drive shaft is configured to be actuated using a torque of less than or equal to 800 N-m, less than or equal to 700 N-m, less than or equal to 600 N-m, less than or equal to 500 N-m, less than or equal to 400 N-m, less than or equal to 300 N-m, less than or equal to 250 N-m, less than or equal to 200 N-m, less than or equal to 150 N-m, less than or equal to 100 N-m, less than or equal to 50 N-m, or less than or equal to 25 N-m. In some embodiments, the drive shaft is configured to be actuated using a torque of greater than or equal to 1 N-m, greater than or equal to 2 N-m, greater than or equal to 25 N-m, greater than or equal to 50 N-m, greater than or equal to 100 N-m, greater than or equal to 150 N-m, greater than or equal to 200 N-m, greater than or equal to 250 N-m, greater than or equal to 300 N-m, greater than or equal to 400 N-m, greater than or equal to 500 N-m, greater than or equal to 600 N-m, or greater than or equal to 700 N-m. Combinations of these ranges are also possible (e.g., greater than or equal to 0 N-m and less than or equal to 800 N-m, or greater than or equal to 0 N-m and less than or equal to 500 N-m). Other ranges, both higher and lower than those described above, are also possible, as the disclosure is not so limited.

To prevent solid material pile-up, the disclosure may be configured to agitate the solid material (e.g., to prevent asymmetric pile-up of material in the tank, and/or to ensure that piles inclined above their angle of repose have enough kinetic energy to properly feed through the metering hopper. Any of a variety of appropriate agitators may be used-however, in some embodiments it may be convenient to use an actuator driven by a drive shaft of the metering hopper. For example, the agitator may be configured to rotate along with the drive shaft, thereby disrupting powder/pellet bridges formed by the solid material, according to some embodiments. In some such embodiments, the agitator may comprise a spiral flighting formed on a rotatable surface oriented towards the material within a hopper of the metering hoppers disclosed herein and angled or curved in a direction away from the material as elaborated on further below in the figures. However, other appropriate agitators may also be used as the disclosure is not so limited.

The metering hoppers provided herein could, in principle, be made from any of a variety of suitable materials and the disclosure is not limited to any particular construction or component composition. However, as discussed above, in some embodiments the disclosure relates to the dispensation and metering of solid materials for use in hydrogen production, and accordingly, in some such embodiments, components of the metering hopper are selected for heightened compatibility with that application. For example, in embodiments where the metering hopper comprises a tank configured to be pressurized, the tank may have an appropriate construction.

A tank suitable for use in a metering hopper provided herein may have a structural component configured to support the pressure. For example, the tank could be made of metal or could be a composite over-wrapped pressure vessel (COPV) comprising a liner supported by a structural composite such as a carbon fiber composite.

In some embodiments, the material to be dispensed may be reactive with a base material of the tank. Accordingly, the tank may include an interior coating (e.g., a polymer coating such as low-density polyethylene, nylon, or other appropriate coating). The interior coating may have any of a variety of suitable purposes. For example, in some embodiments, the coating is configured to prevent contact between the solid material and a metal layer of the tank, since the solid material (e.g., activated aluminum) can, in some embodiments, react or fuse with metals contacted by the solid material, thereby compromising the performance of the tank. Any of a variety of appropriate materials could be used for the coating. For example, the coating may comprise an epoxy, a thermoset polymer, a thermoplastic polymer, or any of a variety of other polymers, depending on the embodiments.

The tank may include a metal layer—e.g., as a structural support or as a liner—to act as a diffusion barrier. The use of a metal diffusion barrier may be advantageous in the context of hydrogen containment, since hydrogen gas is particularly prone to leakage (e.g., via diffusion and/or effusion through solid materials. Metal may also be used in the tank for structural components, such as the drive shaft or the shield. However, it should be noted that metals used in metering hoppers for feeding high pressure hydrogen reactors may be prone to hydrogen embrittlement and/or reaction with solid materials stored in the hopper (e.g., activated aluminum) that can damage performance over time. Accordingly, coating of metal components and/or appropriate selection of metals for metal components may provide long-term performance advantages.

The metering hopper and the components thereof may also be configured to operate at relatively high temperatures. For example, in some embodiments, a metering hopper provided herein is configured to operate at an internal temperature of greater than or equal to 50° C., greater than or equal to 60° C., greater than or equal to 70° C., greater than or equal to 80° C., greater than or equal to 90° C., greater than or equal to 100° C., greater than or equal to 110° C., greater than or equal to 120° C., or greater than or equal to 130° C. In some embodiments, a metering hopper provided herein is configured to operate at an internal temperature of less than or equal to 270° C., less than or equal to 200° C., less than or equal to 150° C., less than or equal to 140° C., less than or equal to 130° C., less than or equal to 120° C., less than or equal to 110° C., less than or equal to 100° C., less than or equal to 90° C., less than or equal to 80° C., less than or equal to 70° C., or less than or equal to 60° C. Combinations of these ranges are also possible (e.g., greater than or equal to 50° C. and less than or equal to 270° C., greater than or equal to 50° C. and less than or equal to 140° C., or greater than or equal to 50° C. and less than or equal to 90° C.). Other ranges, both higher and lower than those described above, are also possible, as the disclosure is not so limited.

It should also be understood that the temperature of the metering hopper can be regulated, e.g., by using one or more heat exchangers to cool the tank, or by metering the reaction in order to limit heat generation and maintain a consistent temperature.

Any of a variety of solid materials may be dispensed from a metering hopper provided herein. According to some embodiments, the metering hopper is particularly advantageous for metering solid pelletized materials. In some embodiments, the metering hopper is suitable for metering dispensation of solid reactant pellets, e.g., to supply a reactor below the metering hopper. The solid reactant pellets may be water reactive, in some embodiments. For example, the solid reactant pellets may comprise activated aluminum (e.g., may be activated aluminum) pellets.

The pellets may have any of a variety of suitable shapes. In some embodiments, the pellets have a substantially uniform shape. For example, the pellets may be similarly shaped and sized (e.g., may roughly conform to a standard geometry), since similarly shaped and sized pellets may be easier to dispense in consistent quantities. For example, similarly sized and shaped pellets may have a more predictable angle of repose, may be less prone to segregation in the hopper, and may, by merit of their standard size, be more likely to be dispensed through the feed slot in consistent amounts. The pellets may be selected to conform to any of a variety of suitable geometric standard shapes. For example, in some embodiments, the pellets comprise a curved surface. For example, the pellets may be spherical, or may be shaped like triangular, rectangular (e.g., square), or hexagonal pillows, according to some embodiments. In some embodiments, the pellets comprise a flat surface. For example, in some embodiments, the pellets comprise a plurality of polyhedra, such as regular polyhedra, prisms, pyramids, or any of a variety of other suitable polyhedral, depending on the embodiment. In other embodiments, the pellets may have other shapes and/or irregular shapes as the disclosure is not so limited.

The solid material may comprise a plurality of pellets having any of a variety of suitable sizes. In some embodiments, a plurality of pellets has an average maximum transverse dimension of greater than or equal to 1 mm, greater than or equal to 1.5 mm, greater than or equal to 2 mm, greater than or equal to 2.5 mm, greater than or equal to 3 mm, greater than or equal to 3.5 mm, greater than or equal to 4 mm, or greater than or equal to 4.5 mm. In some embodiments, a plurality of pellets has an average maximum transverse dimension of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, or less than or equal to 1.5 mm. Combinations of these ranges are also possible (e.g., greater than or equal to 1 mm and less than or equal to 5 mm, or greater than or equal to 2.5 mm and less than or equal to 4 mm). Other ranges, both higher and lower than those described above, are also possible, as the disclosure is not so limited. Of course, it should be understood that solid material of other sizes may also be dispensed by a method provided herein. For example, in some embodiments, at least a portion of the solid material is smaller than the plurality of pellets. For example, the solid material may comprise powder or pellet fragments, e.g., as may result from the breakage of pellets as a consequence of mechanical damage.

The pellets may have any of a variety of suitable angles of repose. The angle of repose of the pellets may depend on any of a variety of factors, including their weight, their shape, their dimensions, their porosity, their roughness, the coefficient of friction between adjacent pellets, and any of a variety of other factors. The angle of repose for a given plurality of pellets may be predicted, or else may be determined experimentally. Depending on the embodiment, pellets can be sized and shaped to have an appropriate angle of repose for use in conjunction with a metering hopper provided herein. In some embodiments, the metering hopper may be adjustable based on the angle of repose of the pellets. For example, in some embodiments the height of a shield of the metering hopper may be adjusted in order to exploit the specific angle of repose of a given plurality of pellets.

The pellets may have any of a variety of suitable angles of repose. In some embodiments, a plurality of pellets has an angle of repose of greater than or equal to 20°, greater than or equal to 25°, greater than or equal to 30°, greater than or equal to 35°, greater than or equal to 40°, greater than or equal to 45°, greater than or equal to 50°, or greater than or equal to 55°. In some embodiments, a plurality of pellets has an angle of repose of less than or equal to less than or equal to 45°, less than or equal to 40°, less than or equal to 35°, less than or equal to 30°, or less than or equal to 25°. Combinations of these ranges are also possible (e.g., greater than or equal to 20° and less than or equal to 45°, or greater than or equal to 25° and less than or equal to) 35°. Other ranges, both higher and lower than those described above, are also possible, as the disclosure is not so limited.

In some embodiments, the metering hopper is configured for use with pellets having an angle of repose within one of the foregoing ranges.

According to some embodiments, the pellets contain a water reactive material. In certain embodiments, and as explained in greater detail herein, the water reactive material may comprise aluminum or an alloy thereof. Without wishing to be bound by theory, water and aluminum react to produce hydrogen gas according to either of the following exothermic reactions shown in reactions (1) and (2):

$$2Al + 4H_2O \longrightarrow 3H_2 + 2AlO(OH) + Q1 \quad (1)$$

$$2Al + 6H_2O \longrightarrow 3H_2 + 2Al(OH)_3 + Q2 \quad (2)$$

where Q1 and/or Q2 are heat.

As noted previously, depending on the embodiment, the water reactive material may comprise any appropriate shape, form, and/or size as detailed above. For example, the material may comprise pellets, balls, particles, and/or chunks of material. The water reactive material may be regularly shaped, such as spherical, or may be irregularly shaped chunks. The size of the water reactive material may be uniform or varied.

As mentioned above, hydrogen gas is produced by exposing water reactive material to water. In some such embodiments, the rate and amount of hydrogen gas produced can be controlled by modifying the type and concentration of certain water reactive materials. In some embodiments, the water reactive material comprises aluminum, as described above in relation to reactions (1) and (2). However, other metals may also be used depending on the particular embodiment. Non-limiting examples of water reactive materials that may be used are aluminum, lithium, sodium, magnesium, zinc, boron, beryllium, alloys thereof, and/or mixtures thereof.

The water reactive materials, in some embodiments, comprise an activating composition that is permeated into the grain boundaries and/or subgrain boundaries of the reactant (e.g., aluminum) to facilitate its reaction with water. For example, a reactant may include aluminum combined with gallium and/or indium. In some instances, the activating composition may be a eutectic, or close to eutectic composition, including for example a eutectic composition of gallium and indium. In one such embodiment, the activating composition may comprise gallium and indium where the portion of the activating composition may have a composition of about 70 wt. % to 80 wt. % gallium and 20 wt. % to 30 wt. % indium, though other weight percentages are also possible. Without wishing to be bound by theory, gallium and/or indium may permeate through one or more grain boundaries and/or subgrain boundaries of the reactant (e.g., aluminum).

In certain embodiments, the activating composition may be incorporated into an alloy with the reactant. A metal alloy may comprise any activating composition in any of a variety of suitable amounts. In some embodiments, for example, the metal alloy comprises greater than or equal to 0.1 wt. % of the activating composition, greater than or equal to 1 wt. %, greater than or equal to 5 wt. %, greater than or equal to 15 wt. %, greater than or equal to 30 wt. %, or greater than or equal to 45 wt. % of the activating composition based on the total weight of the metal alloy. In certain embodiments, the metal alloy comprises less than or equal to 50 wt. %, less than or equal to 40 wt. %, less than or equal to 30 wt. %, less than or equal to 20 wt. %, less than or equal to 10 wt. %, less than or equal to 5 wt. %, or less than or equal to 1 wt. % of the activating composition, based on the total weight of the metal alloy. Combinations of the above recited ranges are also possible (e.g., the metal alloy comprises greater than or equal to 0.1 wt. % and less than or equal to 50 wt. % of the activating composition based on the total weight of the metal alloy, the metal alloy comprises greater than or equal to 1 wt. % and less than or equal to 10 wt. % of the activating composition based on the total weight of metal alloy). In some embodiments, the metal alloy the activating composition is incorporated into may be an aluminum alloy, though other water reactive materials may also be used. Other ranges, both higher and lower than those described above, are also possible, as the disclosure is not so limited.

The Inventors have also realized that hydrogen produced within the reaction chamber can be used for any number of different uses. The produced hydrogen may also be stored under high or low pressure in tanks, canisters, and/or other appropriate pressurized gas containers. The produced hydrogen may also be used for filling lighter than air systems such as balloons (e.g., high altitude balloons, tethered balloons), blimps, and other appropriate systems. The produced hydrogen gas may also be used to produce electricity and/or mechanical work (e.g., via a fuel cell, turbine, and/or internal combustion engine). Thus, the disclosed systems and corresponding produced hydrogen may be used for any number of different applications. In some specific embodiments, hydrogen gas can be used to fill removeable, high-pressure hydrogen canisters that can be integrated into systems such as fuel cells, unmanned aerial vehicles, ground vehicles, ground sensors, cookstoves, or any other appropriate system. The Inventors have realized that low pressure hydrogen can be fed directly into systems to provide electrical power. For example, low pressure hydrogen may be used for continuous power generation for remote sensors, remote command posts, remote charging, or other remote and/or unattended applications. Low pressure hydrogen may also be directly supplied to low-pressure fuel cells.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

In the figures and throughout the application, various components of the metering hopper may be described in terms of pose. As used herein, a pose may refer to the combination of an orientation and location of a component, subject, device, or other object in three-dimensional space. In other words, in some embodiments, a pose may be a particular position in three-dimensional space in combination with a particular angular orientation within three-dimensional space. For example, a relative pose of the housing and an inflatable structure of a device relative to a subject may refer to the position and angular orientation of the device relative to the subject. Thus, pose may also refer to a relative position and/or orientation of one or more objects within three-dimensional space relative to each other as well.

FIG. 1 displays one embodiment of a metering hopper 102 configured to dispense solid material to a reactor chamber 106 as part of a system 100 configured to produce high-pressure hydrogen. As a general overview of the system, in some embodiments, a reactant such as a water-reactive material may combine with water to produce pressurized hydrogen within an internal volume of a reactor chamber 106. The generated hydrogen has a volume under ambient pressure that is much greater than a volume of the headspace present in the reactor chamber 106. Therefore, generation of the hydrogen in this enclosed internal volume of the rigid reactor chamber 106 causes the hydrogen to be self-pressurized to the relatively high pressures disclosed herein. The pressurized hydrogen may flow out from an outlet of the reactor chamber 106 through a hydrogen flow path 105*a* that is fluidly coupled to the outlet of the reactor chamber. As elaborated on further below, this flow of pressurized hydrogen may be conditioned and its pressure regulated to obtain hydrogen with desirable characteristics for an end use (pressure, moisture content, etc.). It should, of course, be understood that metering hopper 102 could be used for any purpose.

As depicted in FIG. 1, in some embodiments, a system 100 may include metering hopper 102 configured to selectively feed a desired amount of the reactant into the internal volume of the reactor chamber 106. The metering hopper 102 may be coupled to the internal volume of the reactor chamber 106 by a material chute 103 configured to direct material dispensed from the metering hopper 102 into the reactor chamber 106.

In some embodiments, the metering hopper 102 may comprise hopper configured to contain the reactant. The metering hopper may further comprise a reactant feeder configured to selectively feed the reactant from the reactant reservoir to the reactor chamber 106. Metering hopper 102 may also include a motor or other appropriate actuator configured to actuate the reactant feeder. During operation, the reactant may be disposed in the reactant reservoir and the reactant feeder may selectively dispense a predetermined amount of reactant from the metering hopper 102 into the reactor chamber 106. It is contemplated that, in some embodiments, selectively feeding a measured amount of the water-reactive material into the reactor chamber 106 may at least partially control a reaction rate and/or an amount of hydrogen produced within the reactor chamber 106. For example, the metering hopper 102 may be configured to dispense a desired amount of the reactant into the reactor chamber at set time intervals and/or based on a sensed pressure from within an internal volume of the reactor chamber 106 to control the reaction. In this way, the amount of hydrogen produced may be controlled by dispensing desired amounts of reactant into the reactant chamber 106.

Returning to the embodiment presented in FIG. 1, the reactor chamber 106 may be operatively connected to the metering hopper 102 and downstream systems in any appropriate manner. For example, in the depicted embodiment, a multiple flow path connector 104, which in the depicted embodiment is a three-way junction, may fluidly couple the internal volume of the reactor chamber 106 with the metering hopper 102 and a hydrogen conduit 105. For example, during operation the multiple flow path connector 104 may couple a material chute 103 of the metering hopper 102 to the internal volume of the reactor chamber 106, allowing the reactant to flow from the metering hopper 102 to reactor chamber 106 through the multiple flow path connector 104. The multiple flow path connector 104 may also fluidly couple the internal volume of the reactor chamber 106 to the hydrogen conduit 105, allowing hydrogen gas to flow from the reactor chamber 106 along a hydrogen flow path 105*a* through hydrogen conduit 105. In this manner, the multiple flow path connector may form at least a portion of the material flow path 103*a* and/or at least a portion of the hydrogen flow path 105*a*. In some embodiments, the hydrogen flow path 105*a* and a material flow path 103*a* may be at least partially coextensive within the multiple flow path connector 104 and a port of the reactor chamber 106. However, embodiments in which these flow paths are separate from each other and/or separate connectors are used are also contemplated.

At a first junction, the multiple flow path connector 104 may be operatively connected to metering hopper 102 such that the multiple flow path connector 104 at least partially defines a material chute 103. The material chute 103 may at least partially define a material flow path 103*a* through which the reactant passes from metering hopper 102. At a second junction, the multiple flow path connector 104 may also be connected to the reactor chamber 106. In some embodiments, the depicted material flow paths 103*a* and hydrogen flow path 105*a* may be at least partially formed by a combined channel 107. Within combined channel 107, the reactant may pass through the material chute, along material flow path 103*a*, and into reactor chamber 106. Hydrogen gas from the reactor chamber may also flow out from the reactor chamber 106 through the combined channel 107. In this regard, combined channel 107 may at least partially define a portion of material flow path 103*a* and at least a portion of hydrogen flow path 105*a*. This arrangement may allow the reactant and/or gas to flow through the multiple flow path connector 104 simultaneously or independently during operation. At a third junction, multiple flow path connector 104 is fluidly connected to the hydrogen conduit 105, thus fluidly coupling the reactor chamber 106 and the hydrogen conduit 105 to allow hydrogen to flow from the reactor chamber 106 through the hydrogen conduit 105 to an outlet or other associated system.

As noted above, it is contemplated that the hydrogen and the reactant may pass through a single channel forming the combined channel 107 in the multiple flow path connector 104. However, in other embodiments, two independent channels for the reactant and the hydrogen formed in a single connector or multiple connectors may be used as the disclosure is not so limited.

As mentioned, producing hydrogen gas within the reactor chamber may lead to elevated temperatures and/or pressures. As such, in some embodiments, a heat exchanger 108 configured to remove heat from the reactor chamber 106 may be disposed within the reactor chamber 106 (e.g., within an internal volume of the reactor chamber 106). As discussed further below, the heat exchanger 108 may absorb heat from within the reactor chamber and remove the heat to an external environment through the flow of a cooling fluid through the heat exchanger 108. In some embodiments, at least one sensor 134 may be disposed within the reactor chamber. For example, the at least one sensor 134 may be configured to sense a temperature and/or pressure within the reactor chamber 106. Signals output from the at least one sensor 134 may allow active monitoring and control of the temperature and/or pressure within the reactor chamber 106 as elaborated on further below.

The depicted hydrogen flow path 105*a* including the hydrogen conduit 105 may be formed using any appropriate types of flow paths capable of supporting the pressures of the generated hydrogen disclosed herein. For example, depending on the embodiment, the hydrogen conduit may comprise pipes, hoses, conduits formed in solid components and/or any other type of flow path capable of transporting the flow of pressurized hydrogen. Depending on the embodiment, the flow paths may be formed from any suitable rigid material and/or construction configured to withstand the elevated pressures and temperatures of the generated hydrogen gas. This may include, but is not limited to rigid plastics, stainless steel, copper, rubber, reinforced tubing, or any other appropriate material as the disclosure is not so limited. In some embodiments, the conduit may be configured to withstand elevated pressures and/or temperatures of the hydrogen gas.

As mentioned previously, heat exchanger 108 is disposed within reactor chamber 106 and is configured to flow the cooling liquid from a cooling liquid source through the heat exchanger. Heat exchanger 108 may be fluidly coupled to the cooling liquid source 110, where the cooling liquid source 110 may either be a source of pressurized or unpressurized cooling liquid that is configured to provide a flow of cooling fluid to the heat exchanger 108.

In embodiments, at least one pressure source 112 may be configured to flow, and in some embodiments circulate, the cooling liquid from the cooling liquid source 110 through the heat exchanger 108. In the embodiment of FIG. 1, the at least one pressure source 112 comprises one or more pumps in fluid communication with cooling liquid source 110 which is depicted as an evaporation tank though other appropriate reservoirs with the cooling liquid disposed therein may also be used.

In depicted embodiment, the at least one pressure source 112 is fluidly coupled to the cooling liquid source 110 and a cooling liquid supply flow path 114*a* which is fluidly coupled to the heat exchanger 108 to provide cooling liquid to the heat exchanger 108 disposed in the reactor chamber 106. Without wishing to be bound by theory, as cooling liquid circulates through heat exchanger 108, energy in the form of heat is removed from reactor chamber 106 and absorbed into the cooling liquid. Removing energy from the reactor chamber may help maintain the temperature within the reactor chamber 106 below a desired threshold temperature. Cooling liquid that has absorbed heat from the reactor chamber 106 may flow out from the heat exchanger 108 through cooling liquid return flow path 116*a* fluidly coupled to an outlet of the heat exchanger 108. In some embodiments, the cooling liquid return flow path 116*a* may be fluidly coupled to the cooling liquid source 110 to permit return of the cooling liquid to the cooling liquid source 110 where heat may be dissipated to the external environment.

In some embodiments, the at least one sensor 134 may be coupled via a wireless or wired electronic connection 138 to one or more controllers 136 which may comprise one or more processors and corresponding non-transitory computer readable memory. The non-transitory computer readable memory may include processor executable instructions that when executed by the one or more processors cause the reactor to perform any of the methods disclosed herein. For example, the one or more controllers 136 may be configured to actuate the at least one pressure source 112 to control the flow of cooling liquid to the heat exchanger 108. During operation, the at least one sensor 134 may output a signal to the one or more controllers 136. Depending on the desired setpoints of the system 100, the one or more controllers may actuate the at least one pressure source 112 to control the rate of flow of cooling liquid through reactor chamber to maintain a temperature of the reactor to be within a desired operational temperature range and/or below a threshold temperature as noted previously above. Alternatively or additionally, the one or more controllers 136 may receive a pressure signal from the at least one sensor 134 and may be configured to control other aspects of the system 100 such as feed rates from the metering hopper 102, valve open or closed states, or other appropriate operating parameters as the disclosure is not so limited.

Hydrogen gas produced within the reactor chamber 106 may contain moisture. For example, heat within the reactor chamber may cause the liquid water within the reactor chamber to produce gaseous water. This gaseous water may mix with the hydrogen gas, causing the system to output "wet" hydrogen. Moisture contained within the hydrogen may cause issues within associated systems that utilize the hydrogen for fuel such as equipment fouling, less efficient combustion, or other undesirable effects. Thus, a conditioning manifold 120 may be fluidly coupled to the hydrogen conduit 105. The conditioning manifold may be configured to remove moisture from the flow of hydrogen gas. For example, the conditioning manifold may comprise a condensation coil fluidly coupled to the hydrogen conduit 105 fluidly coupled to the reactor chamber 106. In some embodiments, the condensation coil may be operatively coupled with a heat exchanger to cause the water vapor to condense within the condensation coil. Appropriate constructions may include, but are not limited to, a tube in tube, a shell in tube, an immersed coil, or other appropriate construction as the disclosure is not so limited.

The conditioning manifold may be appropriately configured and oriented such that condensed water is removed from the flow of hydrogen gas may flow back into the reactor chamber through condensate flow path 118 fluidly coupled to the conditioning manifold 120 and the reactor chamber 106. This may help reduce a frequency at which water is replenished within the reactor chamber while also drying the flow of hydrogen. It is contemplated that the condensate flow path 118 may comprise any suitable type of flow path capable of withstanding the applied pressures and temperatures within the reactor 100 as noted above. In either case, in the depicted embodiment, the condensate may be gravity fed into the reactor chamber 106. In other embodiments, a condensate pump and/or one-way valve may be disposed along condensate flow path 118 to transport the condensate into the reactor chamber 106. Upon exiting the conditioning manifold 120, the hydrogen gas may be considered "dry" as excess moisture has been removed from the flow of hydrogen.

In some embodiments, the cooling liquid source 110 and one or more pressure sources 112 may be used to provide a cooling liquid to the hydrogen conditioning manifold 120 as well. For example, the cooling liquid flow path may branch such that at least one pressure source 112 supplies the cooling liquid through cooling liquid supply 114*b* that is fluidly coupled to the hydrogen conditioning manifold 120 to provide appropriate cooling to cause the gaseous water in the flow of hydrogen to condense into the liquid phase. The cooling liquid, now carrying energy in the form of heat, may then flow through a cooling liquid return 116*b* fluidly coupled to an outlet of the hydrogen conditioning manifold 120 to return the cooling liquid to the cooling liquid source 110, though embodiments in which the cooling liquid is not recirculated are also contemplated. As shown in FIG. 1, in some embodiments cooling liquid returns 116*a* and 116*b* may connect prior to flowing the cooling liquid back into the cooling liquid source 110. While not shown, it is contemplated that a sensor arrangement similar to the arrangement described above can be included in the conditioning manifold. At least one sensor can be disposed within the conditioning manifold to measure properties of the hydrogen gas (e.g., temperature, pressure, humidity, etc.) and relay the measurements to the one or more controllers 136 to regulate the flow of cooling liquid to the hydrogen conditioning manifold 120.

It the above embodiments, the cooling liquid circulating through the reactor chamber and conditioning manifold may be water although any appropriate cooling fluid may be used as the disclosure is not so limited. For example, a refrigeration cycle could be used to provide the desired cooling with an appropriate arrangement of pumps, heat exchangers, and a refrigerant circulation loop. Additionally, while in FIG. 1 the conditioning manifold 120 and reactor chamber 106 share the cooling liquid source 110 and pressure sources 112, it is contemplated that depending on the embodiment, the conditioning manifold 120 and reactor chamber 106 could have separate cooling systems. It is appreciated by the Inventors that in some embodiments a pressure of the cooling liquid in heat exchanger 108 may be less than a pressure of the produced hydrogen gas in the reactor chamber. This may allow for a wider range of options for cooling systems and/or for reduced complexity of the system.

In some embodiments, a filter 122 may also be disposed along the hydrogen flow path. For example, the filter 122 may be fluidly coupled to the hydrogen conditioning manifold 120 or other portion of the hydrogen flow path. The filter 122 may be configured to purify the flow of hydrogen gas. Additionally or alternatively, the filter 122 may include a sulfur trap. Flowing hydrogen through the filter 122 may remove particles from the flow of hydrogen gas such that substantially pure hydrogen may flow out of the filter 122 for use with associated systems. In some embodiments, the filter may comprise a filter material configured to remove impurities from the hydrogen gas. Appropriate types of filters may include, but are not limited to mechanical, chemical, and/or catalytic based filters. In some embodiments, a mechanical filter may include frits, foams, packed beds (including for example packed beds comprising aluminum hydroxide), fibers, and/or other appropriate constructions configured to remove particulates from the flow stream. Chemical or catalytic filters may be configured to remove, or convert, a gas or vapor in the stream that is separate from the desired hydrogen gas.

While a majority of the gaseous water may be removed by the hydrogen conditioning manifold 120, some water may still condense along the flow path downstream from the hydrogen conditioning manifold 120. Thus, in some embodiments, a water trap 124 may also be disposed along the hydrogen flow path 105*a* downstream from the filter 122 and may be configured to capture any excess condensed water that may be present within the hydrogen conduit 105 at this point. Appropriate types of water traps may include, but are not limited to, gravity based water traps including a volume configured to trap and retain condensate along the hydrogen flow path 105*a*. In some embodiments, a selective, water vapor-permeable membrane (e.g., Nafion tubing), desiccants, and/or any other appropriate method may be used to remove water from the flow of hydrogen. However, chemical based water traps (e.g., absorbent materials) may also be used as the disclosure is not limited in this matter. The water trap 124 may be configured to store the excess water, or in some embodiments, may be fluidly coupled to the reactor chamber 106. For example, in some embodiments, similar to the conditioning manifold 120, liquid water may be routed from the water trap 124 back into the reactor chamber.

During operation, hydrogen produced in the reactor chamber may have a pressure greater than a desired pressure. Accordingly, in some embodiments, a pressure regulator 126 may be disposed along the hydrogen flow path 105*a*. The pressure regulator 126 may be configured to reduce the pressure of the hydrogen gas to a desired pressure and/or to be within a desired pressure range. It is contemplated that any appropriate device and/or configuration may be used to regulate the pressure of the hydrogen gas. For example, a pressure regulating valve, static flow restriction, a variable flow restriction, and/or any other type of pressure regulator may be used. In some embodiments, the system 100 may also include a pressure relief valve, not depicted, that may be disposed along the hydrogen flow path 105*a* that opens to the atmosphere when the pressure of the hydrogen gas is above a set threshold pressure. Additionally, in some embodiments, after the hydrogen passes through pressure regulator 126, the hydrogen may pass through a check valve (not shown) to reduce a risk of backflow through the system in the upstream direction towards the reactor chamber 106. The hydrogen may then be directed to one or more high-pressure systems 128 and/or low-pressure systems 130 fluidly coupled to the hydrogen conduit 105, which in the depicted embodiment is an outlet of the pressure regulator 126.

In some embodiments, the high-pressure system may comprise a storage vessel configured to store hydrogen for later use, transportation, and/or use in remote environments. Alternatively, any system using high-pressure hydrogen as fuel may be connected to the system 100 at the high-pressure outlet as the disclosure is not so limited. It is appreciated that high-pressure systems may have a maximum operating pressure. Therefore, maintaining the pressure of hydrogen at or below the maximum operating pressure may improve performance, limit wear, and/or reduce damage to the associated high-pressure system. An isolation valve (not shown) may be disposed along the hydrogen flow path 105*a* at the high-pressure outlet to provide control of the flow of hydrogen out of the high-pressure outlet. The high-pressure outlet may also be configured as a quick-connect to quickly couple and decouple an associated high-pressure system.

While the hydrogen produced within the reactor chamber may be high-pressure, the Inventors have appreciated that system 100 may produce both high- and low-pressure hydrogen. Since the system is producing high-pressure hydrogen, if low-pressure hydrogen is desired, then at least a portion of the high-pressure hydrogen could be regulated down to a lower pressure for use with a low-pressure system 130. In some embodiments the low-pressure system may be connected to a low-pressure outlet of system 100. The low-pressure system may be any appropriate system as the disclosure is not so limited. A flow restriction 132 may be disposed along hydrogen flow path 105*a* prior to the low-pressure outlet. In some embodiments, the flow restriction may comprise a pressure reducing valve, a fixed flow restriction, a variable flow restriction, or any other arrangement, device, or configuration capable of reducing the pressure of the hydrogen gas to be within a desired lower pressure range as the disclosure is not so limited. Low-pressure hydrogen may then flow out of the flow restriction to power equipment directly. For example, continuous low-pressure hydrogen could directly supply a fuel cell with hydrogen fuel. Low-pressure hydrogen can also power remote sensors, charging stations, or any other low-pressure system as the disclosure is not so limited. As with the high-pressure outlet, the low-pressure outlet may comprise an isolation valve to control the flow of hydrogen gas. In some embodiments, the low-pressure outlet may comprise a quick-connect to facilitate a convenient connection between the reactor chamber and the low-pressure system.

Although not shown, system 100 may further comprise valving at desired locations to selectively isolate parts of the system (e.g. isolation valve), control flow (e.g., one-way valve, check valve), and/or control pressure (e.g. pressure regulators, pressure reducing valves, pressure relief valves, burst disks, etc.). The system may also include various sensors throughout the system to measure and/or monitor conditions within the system. The sensors may be connected to a controller to manipulate any appropriate equipment (e.g., valves, pumps, dispensers, outlets, etc.) to control any desired conditions (e.g., flows, reaction rates, temperatures, pressures, humidity, etc.). Additionally, it is contemplated that the various portions of the system may be connected to each other using any appropriate fittings and couplings capable of appropriately connecting and sealing the various portions of the system 100 to each other. For example, gas quick-connect fittings, compression fittings, flange and seal arrangements, and/or any other appropriate type of fluid and gas tight connection capable of supporting the pressure and temperatures disclosed herein may be used as the disclosure is not so limited.

In addition to the above, in some embodiments it is also contemplated that a vacuum pump (not shown) may be in fluid communication with the hydrogen flow path 105*a* to permit evacuation of the hydrogen flow path 105*a* (e.g., conduits, filters, conditioning modules, etc.) prior to hydrogen generation. This may help eliminate other gases, contaminants, moisture, etc., within the hydrogen flow path 105*a* which may improve the quality of hydrogen produced by the system.

Figure 2:
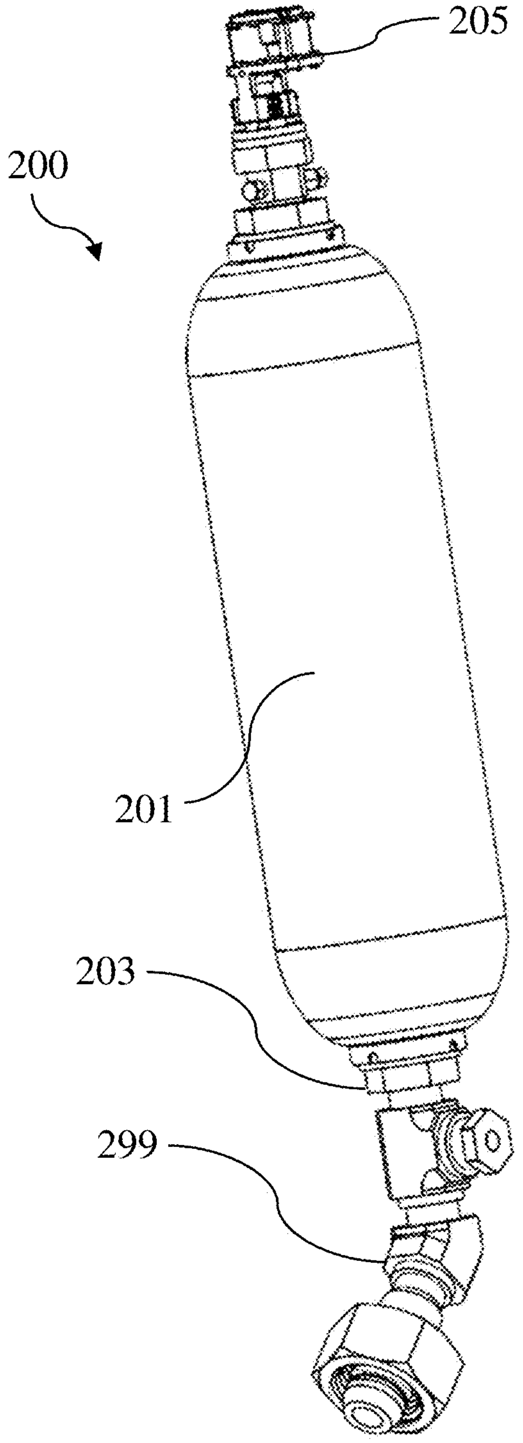
FIG. 2 provides a schematic perspective illustration of a non-limiting metering hopper, according to some embodiments.

FIGS. 2-18 provide a variety of schematic representations of a non-limiting metering hopper, according to some embodiments. FIG. 2 provides a schematic perspective illustration of non-limiting metering hopper 200, according to some embodiments. Metering hopper 200 comprises hopper 201, configured to hold a solid material. Hopper 201 may have any of a variety of appropriate sizes and shapes, depending on the embodiment. For example, in FIG. 2, hopper 201 is illustrated as a tank—but in general, hopper 201 could be an open container or a closed container and could be capable of containing a pressurized fluid or not, depending on the embodiment, since the disclosure is not so limited.

The hopper may be configured to hold an appropriate volume and/or weight of solid material. In some embodiments, a hopper is configured to hold a weight of greater than or equal to 5 kg, greater than or equal to 10 kg, greater than or equal to 15 kg, greater than or equal to 20 kg, greater than or equal to 25 kg, greater than or equal to 30 kg, greater than or equal to 35 kg, greater than or equal to 40 kg, or greater than or equal to 45 kg of solid material. In some embodiments, a hopper is configured to hold a weight of less than or equal to 50 kg, less than or equal to 45 kg, less than or equal to 40 kg, less than or equal to 35 kg, less than or equal to 30 kg, less than or equal to 25 kg, less than or equal to 20 kg, less than or equal to 15 kg, or less than or equal to 10 kg of solid material. Combinations of these ranges are also possible (e.g., or greater than or equal to 5 kg and less than or equal to 50 kg). Other ranges, both higher and lower than those described above, are also possible, as the disclosure is not so limited.

Hopper 201 may be configured to sustain relatively high pressures and temperatures, as discussed above. In some embodiments, the pressure and temperature are moderated by the metering hopper itself, e.g., by metering the reaction rate in a reactor chamber connected to hopper 201 using metering hopper 200. However, the temperature of the metering hopper can be regulated, e.g., by using one or more heat exchangers to cool hopper 201. Analogs to the heat exchangers described above, with reference to FIG. 1, could be used in the metering hopper, for example.

Coupled to the top of hopper 201 is actuator 205, represented in this non-limiting embodiment as a motor configured to rotate a drive shaft within hopper 201. The drive shaft is shown in later figures, and may be configured to actuate a feed slot cover shown in later figures. As shown, the actuator 205 of metering hopper 200 is external to hopper 201, a configuration that may be particularly advantageous in the context of pressurized metering hoppers or metering hoppers for feeding chemical reactions. For example, external placement of actuator 205 may reduce corrosion, degradation, or wear of actuator 205 by shielding it from comparatively harsher conditions within the tank. Moreover, the external placement of actuator 205 may isolate actuator 205 from the hydrogen in hopper 201, at least in the particular case of a metering hopper configured to feed a hydrogen reactor. However, it should, of course, be understood that actuator 205 could also be placed within hopper 201 of metering hopper 200, as the disclosure is not so limited.

Actuator 205 may be a motor. Any of a variety of suitable motors may be used, depending on the embodiment. For example, the motor could be an electric motor (e.g., a step motor, a servo motor), a magnetic motor, or any of a variety of other types of motor, as the disclosure is not so limited. Although actuator 205 is configured to rotate the drive shaft, it should of course be understood that other appropriate actuators capable of actuating metering hopper 200 could also be used.

At the bottom of hopper 201 opposite from actuator 205 is an outlet 203, through which metering hopper 200 is configured to dispense a solid material from hopper 201 at a metered rate. According to some embodiments, the outlet is connected to a reactor (not shown)—either via a direct coupling or via a connector like connector 299. Solid material may fall through the outlet and into the reactor as a result of local direction of gravity relative to the hopper 201 during operation, thereby feeding the reactor at a rate metered by dispensation of fuel from metering hopper 200. The solid material may fall vertically or may be directed towards the reactor at an angle (e.g., using an angled connecter 299 as shown). Where an angled coupling is used, the angled coupling may be configured to keep the angle higher than an angle of repose of the solid material. Additionally, it should be understood that in some embodiments the outlet of metering hopper 200 is not connected to a reactor, and metering hopper 200 is instead configured to dispense solid material into another container or onto another location, depending on the embodiment.

Figure 3:
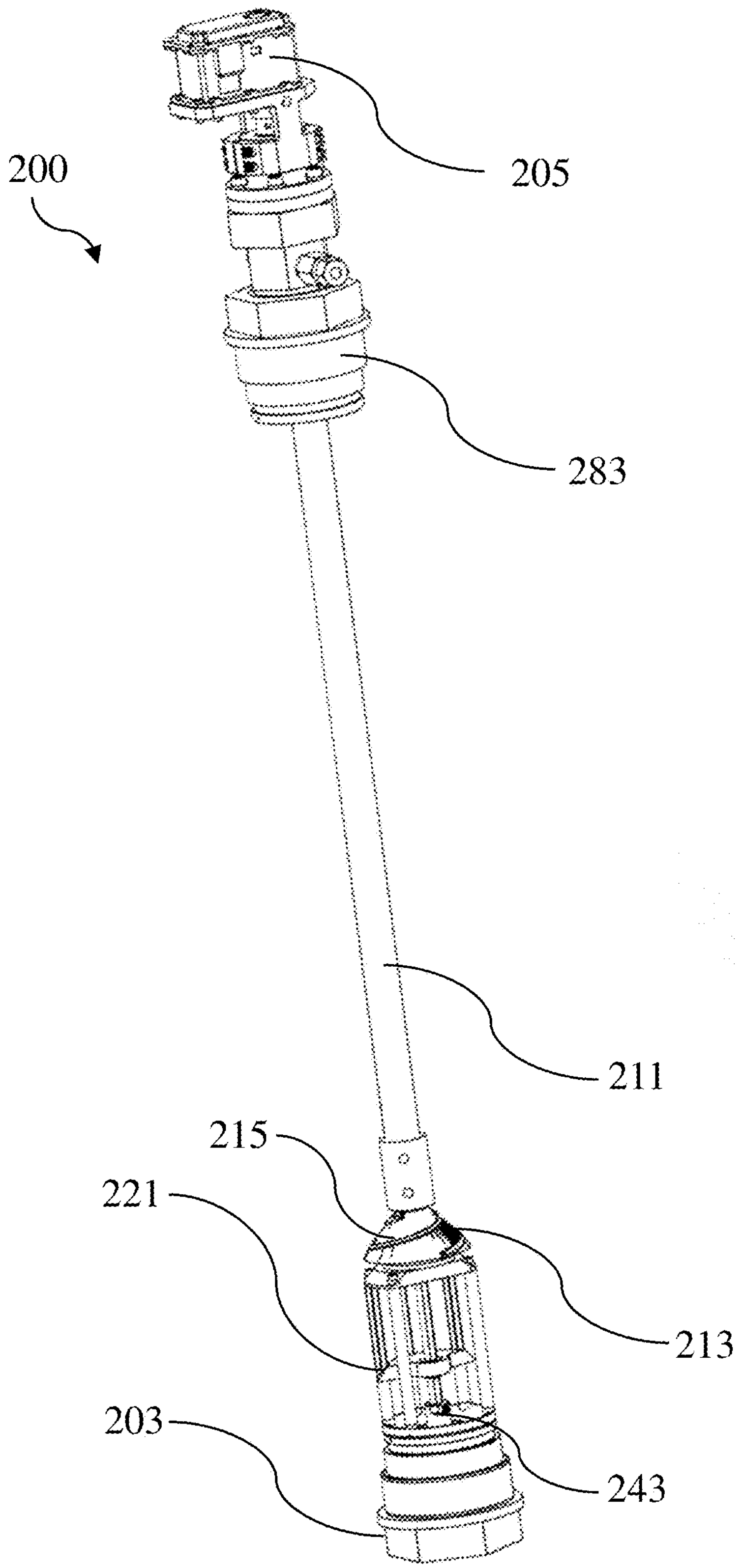
FIG. 3 provides a schematic perspective illustration of a portion of a non-limiting metering hopper, according to some embodiments.
Figure 4:
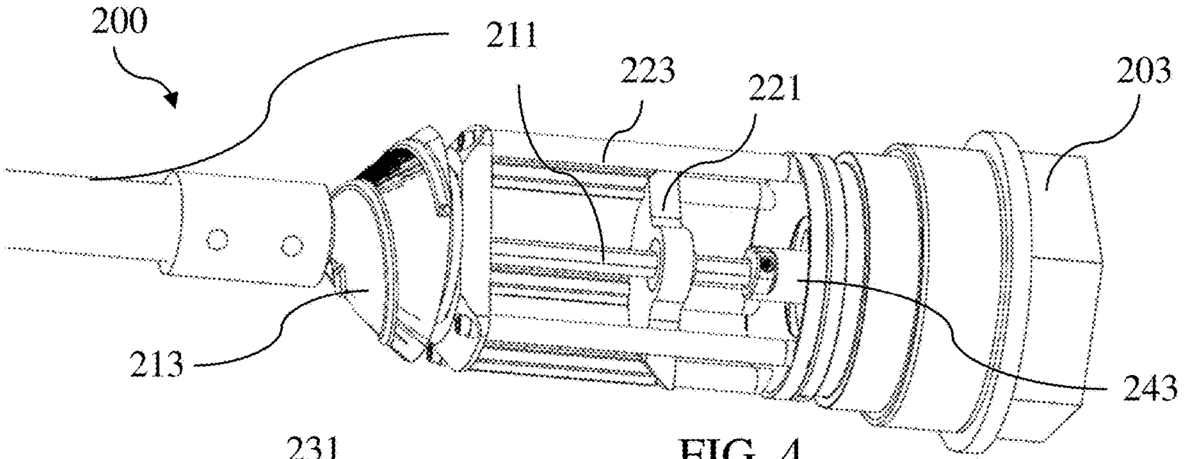
FIG. 4 provides a schematic perspective illustration of a portion of a non-limiting metering hopper comprising a shield covering a feed stock, according to some embodiments.

FIG. 3 provides a schematic perspective illustration of a portion non-limiting metering hopper 200, according to some embodiments. To produce this figure, connecter 299 and hopper 201 have been hidden to reveal the coupling of actuator 205 to drive shaft 211 via a passthrough 283 into hopper 201. The passthrough is configured to allow actuator 205 to rotate drive shaft 211 while maintaining the pressure in hopper 201, according to some embodiments.

At the end portion of drive shaft 211 opposite actuator 205, drive shaft 211 is coupled to an agitator 213 and a feed slot cover 243 (more clearly shown and discussed in later figures). Agitator 213 is configured to prevent the pile-up of solid material (e.g., pellets) by agitating the solid material in hopper 201. Any of a variety of agitators may be used. In some embodiments, the agitator is configured to agitate the solid material via rotation around an axis of rotation. For example, agitator 215 is configured to rotate around the rotational axis of drive shaft 211. In some embodiments, at least a portion of the agitator has rotational symmetry around the axis of rotation. A rotationally symmetrical agitator may be advantageous for an agitator that rotates because the rotational symmetry may reduce the torque required to actuate the agitator (by ensuring symmetrical loading of actuator 205 by the solid material). For example, agitator 213 is a conical agitator. A conical agitator may be advantageous because it may help to drive the motion of solid material downward (e.g., when the cone is angled at an angle exceeding the angle of repose).

However, exceeding the angle of repose is not necessary for the agitator to work properly. The agitator may, for example, have one or more features designed to drive the flow of solid material downward without relying on the angle of repose. For example, agitator 213 comprises a spiral flighting 215 oriented and extending upwards from a surface of the agitator (at least partially opposite from the local direction of gravity during use of metering hopper 200) and configured to impart rotational momentum to at least some of the solid material, thereby agitating adjacent material and causing the solid material to flow downward past the agitator 213. Of course, it should be appreciated that other agitator designs are also possible, as the disclosure is not limited to any particular type of agitator.

Beneath agitator 213 is feed slot cover 243 configured to cover or uncover a feed slot (shown in subsequent figures) providing a path to outlet 203. The feed slot is covered by shield 221, which is configured to prevent solid material from falling directly onto the feed slot. This effect is discussed in greater detail below, with reference to subsequent figures.

FIGS. 4-8 provide schematic perspective illustrations of portions of non-limiting metering hopper 200, illustrating the position of shield 221, feed slot, 241, feed slot cover 243, and drive shaft 211 in more detail. As shown, drive shaft 211 is coupled to agitator 213 and extends through agitator 213 and shield 221 in order to couple with feed slot cover 243. Beneath feed slot cover 243 and feed slot 241 is outlet 203.

As shown in the figures, shield 221 is positioned vertically above and laterally aligned with feed slot 241 (with respect to a local direction of gravity and/or a longitudinal axis of the drive shaft 211 when metering hopper 200 is in use). This shield configuration may prevent the chute-through of solid material (e.g., solid pellets) through feed slot 241. As FIGS. 6 and 8 most clearly illustrate, feed slot cover 243 is depicted in an open configuration such that its receiver slot 245 is aligned with feed slot 241. In this open configuration of feed slot cover 243, shield 221 covers receiver slot 245. However, rotation of feed slot cover 245 around the rotational axis of drive shaft 211 would bring receiver slot 245 out of alignment with feed slot 241, thereby closing feed slot 241. When feed slot cover 243 is rotated into a closed configuration, the new position of feed slot cover 243 would result in the shield 221 being spaced apart from a lateral position of the receiver slot 245 in the closed configuration when feed slot 241 is positioned vertically below shield 221 relative to a direction of gravity during operation. Thus, receiver slot 245 is exposed to the direct fall of solid material (e.g., solid pellets) during a first portion of the rotation of drive shaft 211 and may be shielded from the direct fall of sold material during a second portion of the rotation of drive shaft 211, according to some embodiments.

Figure 9:
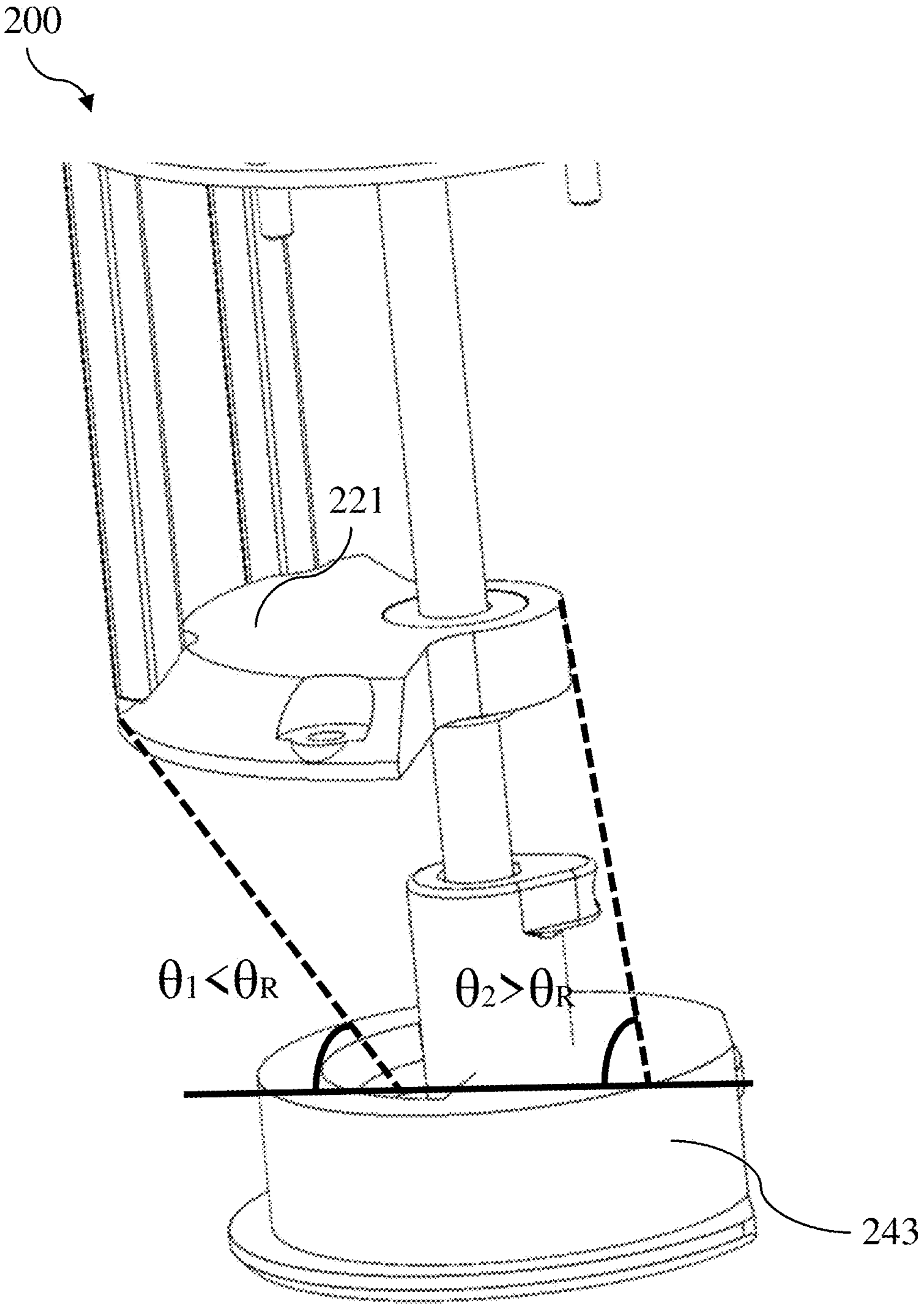
FIG. 9 provides a schematic perspective illustration of a portion of a non-limiting metering hopper, illustrating how a shield can direct a flow of a solid material based on the solid material's angle of repose, according to some embodiments.

Shield 221 may be appropriately positioned to prevent the free flow of solid material into feed slot 241 when the feed slot cover 243 is in the open configuration. For example, shield 221 may be configured to ensure that solid material piled around feed slot 241 remains below its angle of repose due to a size, shape, and position of the shield 221 relative to the feed slot 241. FIG. 9 provides a schematic perspective illustration of shield 221, illustrating how shield 221's shape and position can be used to direct a flow of a solid material based on the solid material's angle of repose, $\theta_R$, according to some embodiments. (Note that several supports have been hidden from the figure in order to provide a clearer view.) FIG. 9 illustrates a first angle, $\theta_1$, between a first outer portion of shield 221 closest to feed slot 241 and receiver slot 245, and further illustrates a second angle, $\theta_2$, between a second outer portion of shield 221 closest to receiver slot 245 in a closed configuration. (Receiver slot 245 is actually illustrated in the open configuration, but the vertex of second angle $\theta_2$ is positioned appropriately to correspond to the position of receiver slot 245 in the closed configuration.) As shown, shield 221 is positioned so that first angle $\theta_1$ is less than the angle of repose, $\theta_R$, of the solid material (e.g., the solid pellets) but second angle $\theta_2$ is greater than the angle of repose $\theta_R$. Thus, solid material piled at 01 can reach a state of repose that will stop its slide into feed slot 241, while solid material at 02 will tend to fall onto feed slot cover 243 rather than piling up around it, supplying a continuous feed of solid material to feed slot 241.

Shield 221 is presented in FIGS. 4-9 as a plate; however, in general, any of a variety of suitable shield configurations could be used, as the disclosure is not limited to any particular shield design. For example, as long as shield 221 is configurable to block the flow of solid material onto feed slot 241, shield 221 could comprise a mesh, a plurality of bars, or any other structure capable of blocking the solid material from flowing through the structure. Likewise, although shield 221 is presented as mostly flat, a flat configuration is not required and shield 221 could be curved (e.g., domed), and/or have any other appropriate shape depending on the embodiment.

Shielding of feed slot 241 (e.g., by directing the flow of solid material based on its angle of response, as illustrated in FIG. 9) may be accomplished, at least in part, by controlling the vertical spacing between shield 221 and feed slot 241. Thus, where the solid material has a higher angle of repose, shield 221 may be separated from feed slot 241 by a greater vertical spacing, and where the solid material has a lower angle of repose, shield 221 may be separated from feed slot 241 by a smaller vertical spacing. In some embodiments, shield 221 is spaced at a vertical spacing from feed slot 241 of greater than or equal to 2 cm, greater than or equal to 2.5 cm, greater than or equal to 3 cm, greater than or equal to 3.5 cm, greater than or equal to 4 cm, or greater than or equal to 4.5 cm. In some embodiments, shield 221 is spaced at a vertical spacing from feed slot 241 of less than or equal to 5 cm, less than or equal to 4.5 cm, less than or equal to 4 cm, less than or equal to 3.5 cm, less than or equal to 3 cm, or less than or equal to 2.5 cm. Combinations of these ranges are also possible (e.g., greater than or equal to 2 cm and less than or equal to 5 cm, or greater than or equal to 2.5 cm and less than or equal to 4 cm). Other ranges, both higher and lower than those described above, are also possible, as the disclosure is not so limited.

The shield may cover any of a variety of suitable proportions of the lateral area of feed slot cover 243. In some embodiments, a shield covers greater than or equal to 30%, greater than or equal to 35%, greater than or equal to 40%, greater than or equal to 45%, greater than or equal to 50%, greater than or equal to 55%, greater than or equal to 60%, or greater than or equal to 65% of the lateral area of the feed slot 241. In some embodiments, a shield covers less than or equal to 70%, less than or equal to 65%, less than or equal to 60%, less than or equal to 55%, less than or equal to 50%, less than or equal to 45%, less than or equal to 40%, or less than or equal to 35% of the lateral area of the feed slot 241. Combinations of these ranges are also possible (e.g., greater than or equal to 30% and less than or equal to 70%, or greater than or equal to 40% and less than or equal to 60%). Other ranges, both higher and lower than those described above, are also possible, as the disclosure is not so limited.

It should, of course, be understood that the shape (e.g., the lateral shape) of shield 221 may play a role in controlling the flow of solid material, and that any of a variety of shield shapes may be chosen, depending on the embodiment.

In FIGS. 4-9, drive shaft 211 passes directly through shield 221; however, drive shaft 211 is not fixedly coupled to shield 221 and shield 221 does not rotate. Rather, shield 221 is rotationally fixed in place relative to the reactor hopper 201. Instead, the shield 221 may be rotatably coupled toy the drive shaft 211 by bearing 225 seated in shield 221 and configured to rotate in its seat while remaining stationary relative to the hopper 201. As shown in FIGS. 4-9, shield 221 comprises a circular portion arranged perpendicular to drive shaft 211 and connected to a ring that surrounds drive shaft 211 and bearing 225. The circular portion has a substantially semi-circular shape, but could have any of a variety of suitable angles. It should, of course, be understood that the shield could have any of a variety of suitable shapes, as the disclosure is not so limited. In some embodiments, drive shaft 211 need not pass through shield 221; shield 221 may, instead, be shaped to sit adjacent to the drive shaft without encircling drive shaft 211. For example, if the ring of shield 221 in FIGS. 4-9 were removed, leaving only the circular portion, the shield could still perform its function without surrounding the drive shaft.

As illustrated in FIGS. 4-9, the pose of shield 221 (i.e., a position and angular orientation) relative to the hopper 201 may be maintained using one or more supports 223. The supports may be configured to support shield 221 and to maintain its lateral position. Supports 223 may be configured to maintain the pose of shield 221 relative to hopper 201. For example, supports 223 may be anchored to hopper 201 so that they can transfer load from shield 221 to hopper 201, preventing rotational, longitudinal, and/or translational motion of supports 223 or shield 221. Any of a variety of suitable supports may be chosen. For example, supports 223 are presented as pillars extending vertically through and configured to support shield 221. However, shield 221 could instead be supported by walls, suspension cables, trusses, or any of a variety of other suitable support mechanisms known to those of ordinary skill in the art, as the disclosure is not particularly limited with respect to how shield 221 is suspended.

Figure 5:
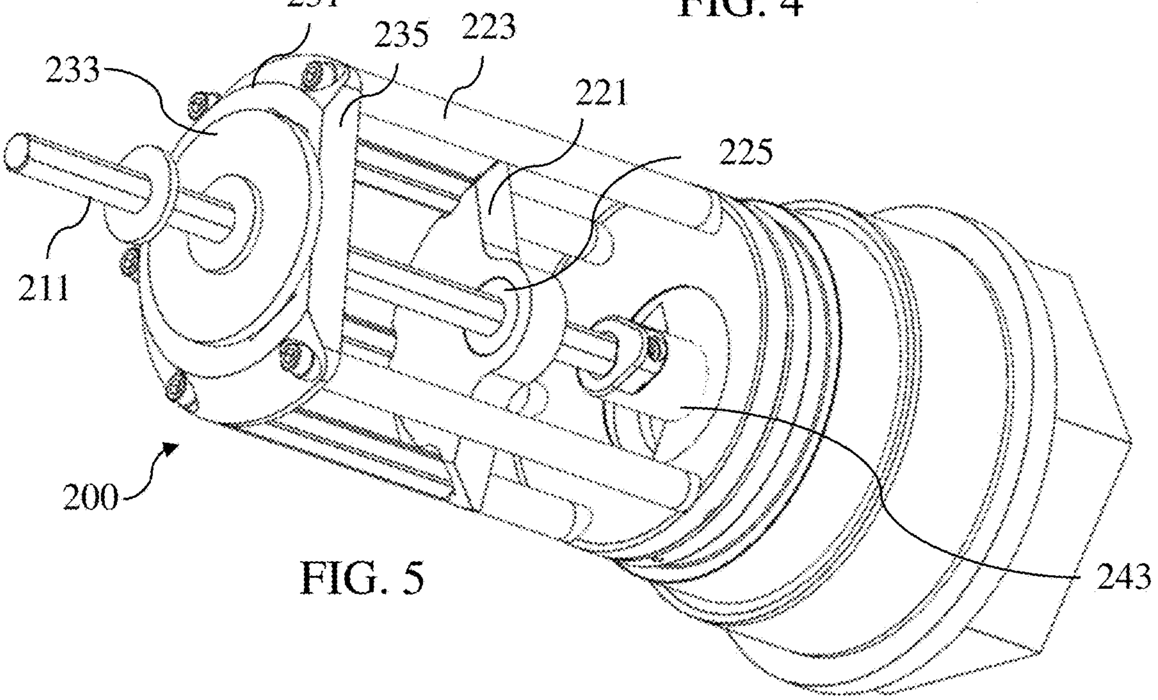
FIG. 5 provides a schematic perspective illustration of a portion of a non-limiting metering hopper comprising a shield covering a feed stock, according to some embodiments.
Figure 6:
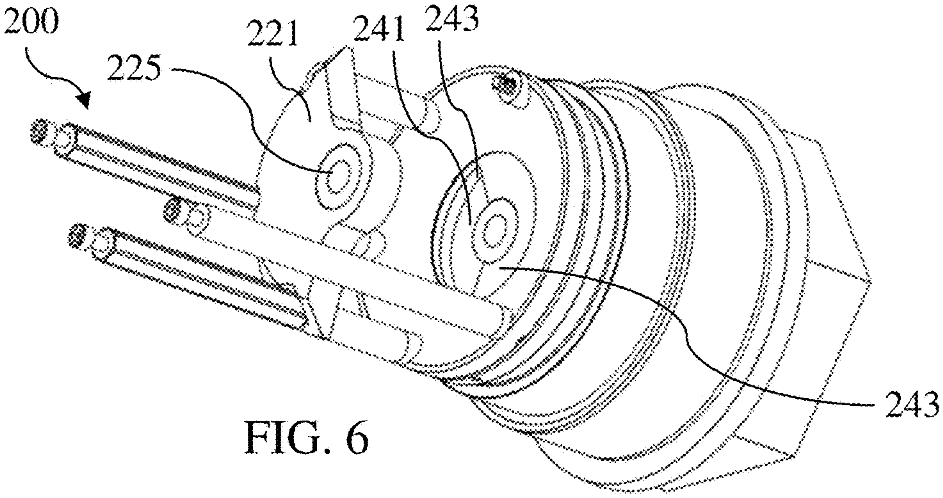
FIG. 6 provides a schematic perspective illustration of a portion of a non-limiting metering hopper comprising a shield covering a feed stock, according to some embodiments.
Figure 7:
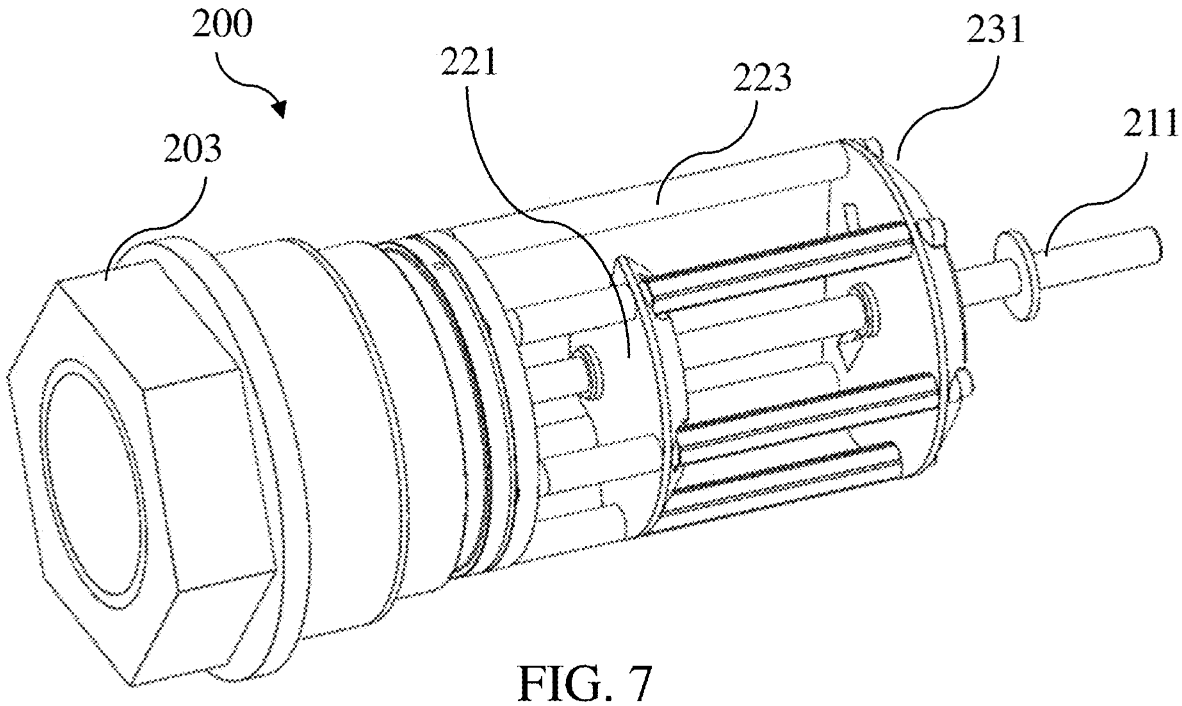
FIG. 7 provides a schematic perspective illustration of a portion of a non-limiting metering hopper comprising a shield covering a feed stock, according to some embodiments.
Figure 8:
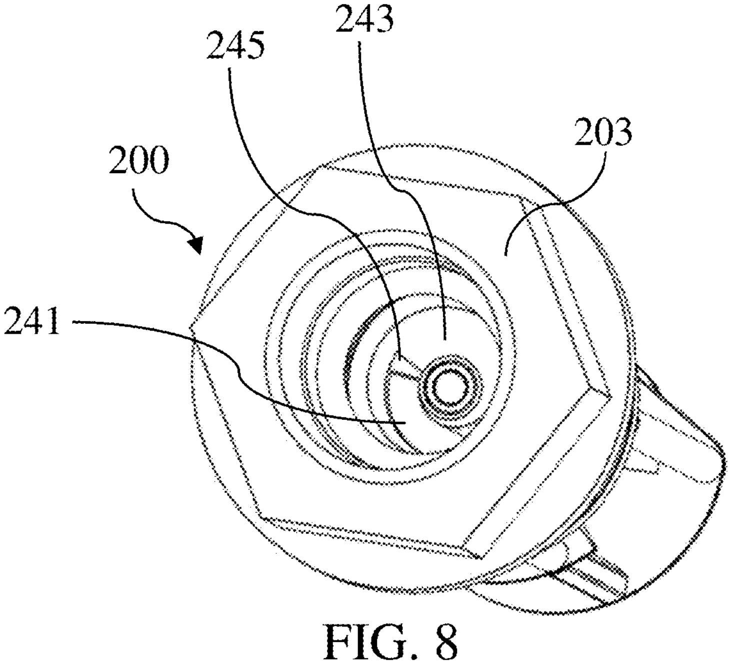
FIG. 8 provides a schematic perspective illustration of a portion of a non-limiting metering hopper comprising a shield covering a feed stock, according to some embodiments.

As shown most clearly in FIG. 5, metering hopper 200 may comprise a cover plate 231 positioned above shield 221. Cover plate 231 may be configured to support the solid material in hopper 201, e.g., so that the weight of the solid material does not fall entirely upon shield 221. The cover plate 231 may also be configured to function as a barrier such that the solid material (e.g., the metallic pellets) are substantially prevented from flooding into the slot 241 in an uncontrolled manner. The use of a cover plate may be particularly advantageous in the context of heavy solid materials (e.g., metallic pellets) that would otherwise place a high stress on shield 221. As with shield 221, drive shaft 211 passes through cover plate 231 and is seated in a bearing that separates drive shaft 211 from the cover plate to prevent rotation of the cover plate. Since the solid material in hopper 201 may contain powders that could jam or damage the bearing, the bearing is covered by a bearing cover 231 situated below agitator 213. The bearing cover may prevent entry of powder into the bearing, increasing the durability of metering hopper 200.

Like shield 221, cover plate 231 is supported by supports 223 which may be configured to maintain a desired pose of the cover plate 231 within the hopper 201 and relative to the other components contained therein. Supports 223 may be configured to maintain the pose of cover plate 231 relative to hopper 201. For example, supports 223 may be anchored to hopper 201 so that they can transfer load from cover plate 231 to hopper 201, preventing rotational, longitudinal, and/or translational motion of supports 223 or cover plate 231. At least some of supports 223 of cover plate 231 may be the same as supports 223 for shield 221 (e.g., in FIGS. 4-9 some of supports 223 pass through shield 221 in order to support both shield 221 and cover plate 231). However, some or all of the supports of the cover plate may support the cover plate alone. For example, some of supports 223 shown in FIGS. 4-9 support cover plate 231 but not shield 221. It should, of course, be understood that some supports may be configured to support shield 221 but not the cover plate, as the disclosure is not limited to any particular support configuration. And, cover plate 231 could instead be supported by walls, suspension cables, trusses, or any of a variety of other suitable support mechanisms known to those of ordinary skill in the art, as the disclosure is not particularly limited with respect to how cover plate 231 is suspended.

The cover plate may be separated from feed slot 241 by a vertical spacing greater than the vertical spacing of shield 221 from feed slot 241. Any of a variety of vertical spacings may be used. In some embodiments, a cover plate and a feed slot may be separated by a vertical spacing of greater than or equal to 4 cm, greater than or equal to 5 cm, greater than or equal to 6 cm, greater than or equal to 7 cm, greater than or equal to 8 cm, or greater than or equal to 9 cm. In some embodiments, a cover plate and a feed slot may be separated by a vertical spacing of less than or equal to 10 cm, less than or equal to 9 cm, less than or equal to 8 cm, less than or equal to 7 cm, less than or equal to 6 cm, or less than or equal to 5 cm. Combinations of these ranges are also possible (e.g., or greater than or equal to 4 cm and less than or equal to 10 cm). Other ranges, both higher and lower than those described above, are also possible, as the disclosure is not so limited.

The cover plate may be shaped to leave a direct path for solid material to fall onto feed slot cover 243, according to some embodiments. For example, the lateral cross-section of cover plate 231 would be circular, except that a circular segment is missing from the cross-section, leaving a flat edge 235 past which solid material can fall. Such a configuration may allow the plate to preferentially direct the flow of solid material in metering hopper 200. For example, the cover plate in metering hopper 200 is configured to preferentially allow the flow of solid material on a side of drive shaft 211 opposite feed slot 241, reducing the relative rate of flow towards feed slot 241 but permitting the flow of material onto feed slot cover 243.

Likewise, while supports 223 of may have any of a variety of appropriate lateral positions and spacings, supports 223 may be arranged, according to some embodiments, to preferentially direct the flow of solid material towards the side of drive shaft 211 opposite feed slot 241. Supports 223 are spaced to create gaps between adjacent supports 223 of the plurality of supports 223, where the gaps are sized and shaped to permit the solid pellets to pass through the gaps to feed slot 241. For example, the gap between each pair of adjacent supports 223 may permit the flow of solid material therethrough, according to some embodiments. However, the gaps need not be equally sized; in FIG. 5, for example, supports 223 have wider gaps on the side of drive shaft 211 opposite feed slot 241, meaning that supports 223 provide less of an obstruction to the flow of solid material than supports 223 closer to feed slot 241. Similarly, where walls, suspension cables, or other support mechanisms are used to support shield 221 or cover plate 231, they may be configured to leave appropriately sized and placed gaps to control the flow of solid material. For example, solid walls extending around portions of the perimeter of the feed slot cover could be used to support the cover plate and/or the shield, and the solid wall could include gaps positioned to facilitate flow of solid material to the feed slot cover on a side of the drive shaft opposite the feed slot while blocking the flow of solid material directly onto the feed slot.

It should be noted that the directed flow of solid material using cover plates, shields, and supports as described above can create issues with pile-up of solid material on one side of the tank, interrupting the flow of material to feed slot 241. This illustrates the advantage of using agitator 213—by rotating against solid material piled up above feed slot 241, agitator 213 drives the solid material to the opposite side of metering hopper 200, where it falls down towards feed slot cover 243 and where it is ultimately able to pass to the outlet in a metered fashion. Thus, the combination and arrangement of these components can, it has been inventively discovered, give rise to an unusually consistent metered flow of solid material, in at least some embodiments.

Figure 10:
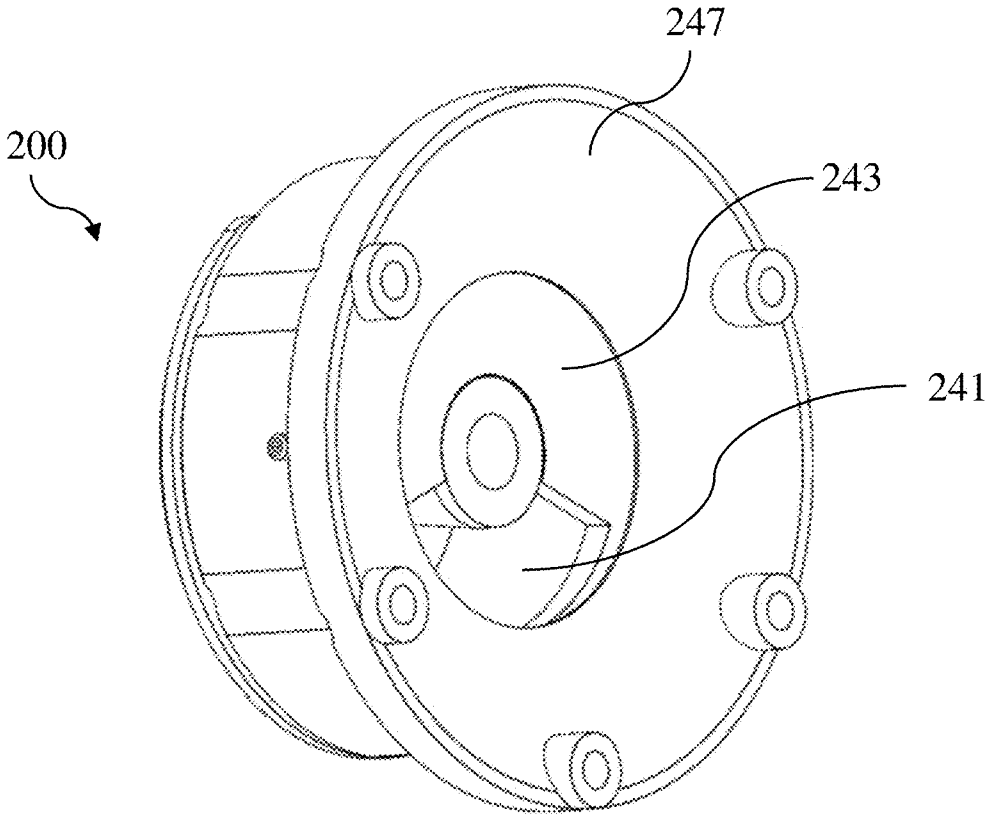
FIG. 10 provides a schematic perspective illustration of a portion of a non-limiting metering hopper comprising a bowl directed towards a feed slot and feed slot cover, according to some embodiments.

FIG. 10 provides a schematic perspective illustration of a portion metering hopper 200 showing feed slot 241 and surrounding elements in more detail. As shown, in some embodiments metering hopper 200 comprises a bowl directed towards feed slot 241 and feed slot cover 243, according to some embodiments. The bowl may be configured to catch falling pellets and direct them towards feed slot 241 in a controlled, fashion. Any of a variety of bowl shapes may be used, as the disclosure is not particularly limited.

Figure 11:
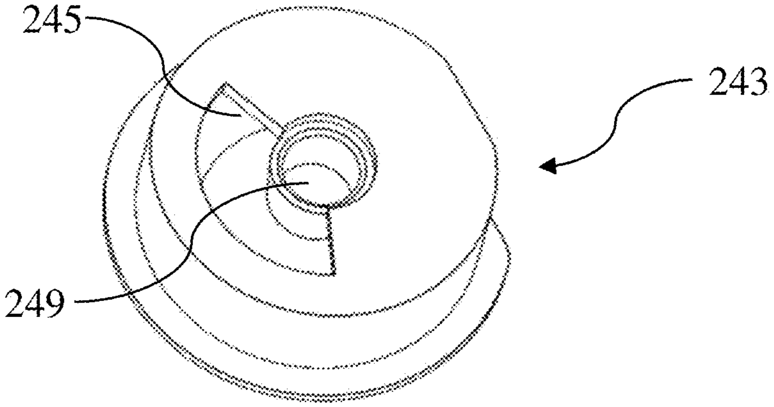
FIG. 11 provides a schematic perspective illustration of a non-limiting feed slot and feed slot cover, according to some embodiments.

FIG. 11 provides a schematic perspective illustration of feed slot cover 243 by itself. As illustrated, it comprises receiver slot 245 as well as a coupling portion 249 configured to couple feed slot cover 243 to an actuator (not shown). For example, coupling portion 249 is configured to couple feed slot cover 243 to a drive shaft inserted into the coupling portion (though of course, it should be understood that other configurations, e.g., where the drive shaft is welded to the coupling portion or fastened to the coupling portion are also possible). Rotation of the drive shaft may thus cause the coupling portion to rotate, thereby actuating feed slot cover 243 by moving receiver slot 245 into or out of alignment with feed slot 241.

Figure 12:
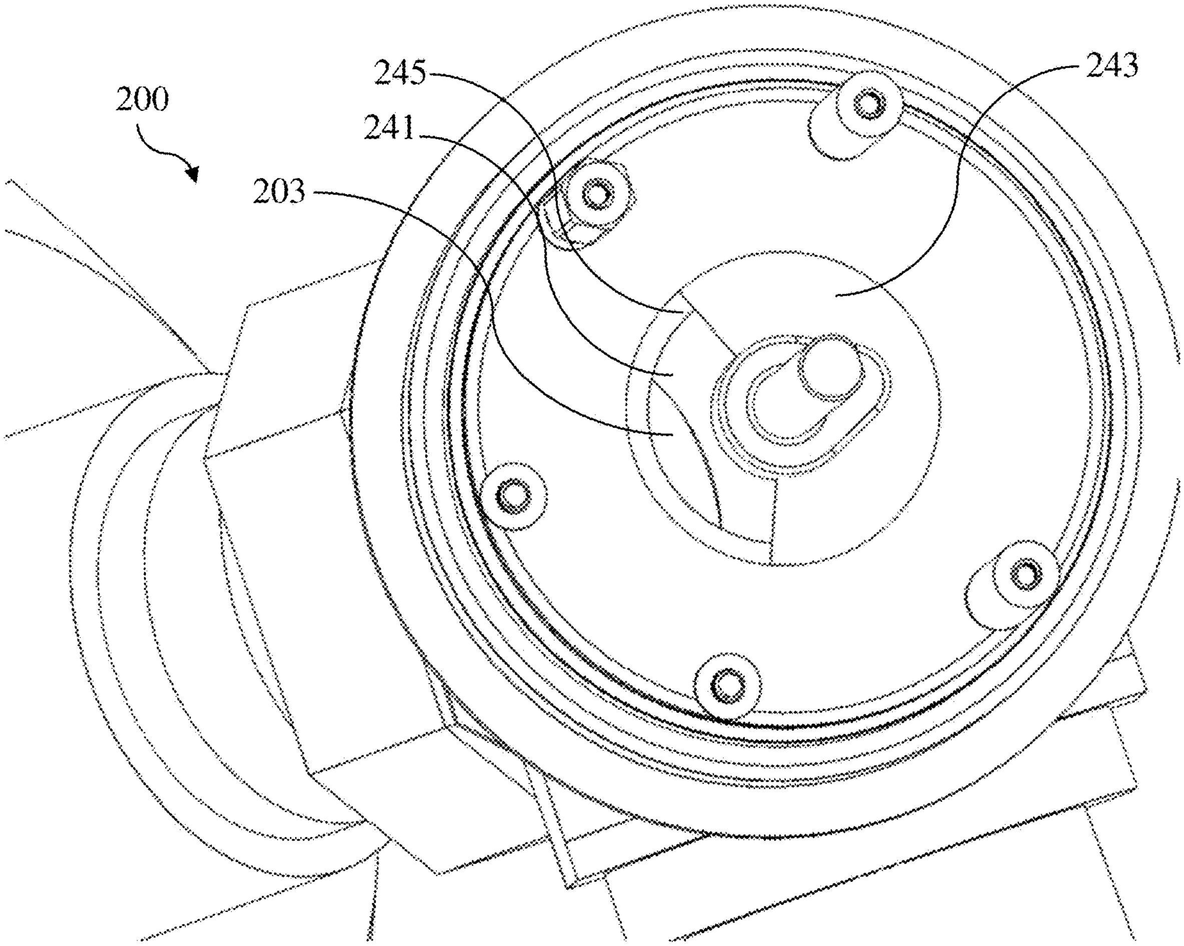
FIG. 12 provides a schematic, top view illustration of a portion of a non-limiting metering hopper comprising a feed slot cover in the open configuration, according to some embodiments.

FIG. 12 provides a schematic, top view illustration of a portion of metering hopper 200, illustrating how alignment of receiver slot 245 with feed slot 241 reveals a direct path to outlet 203, according to some embodiments. Thus, the open configuration of feed slot cover 243 allows solid material to fall directly to the outlet when metering hopper 200 is in use, according to some embodiments.

Figure 13:
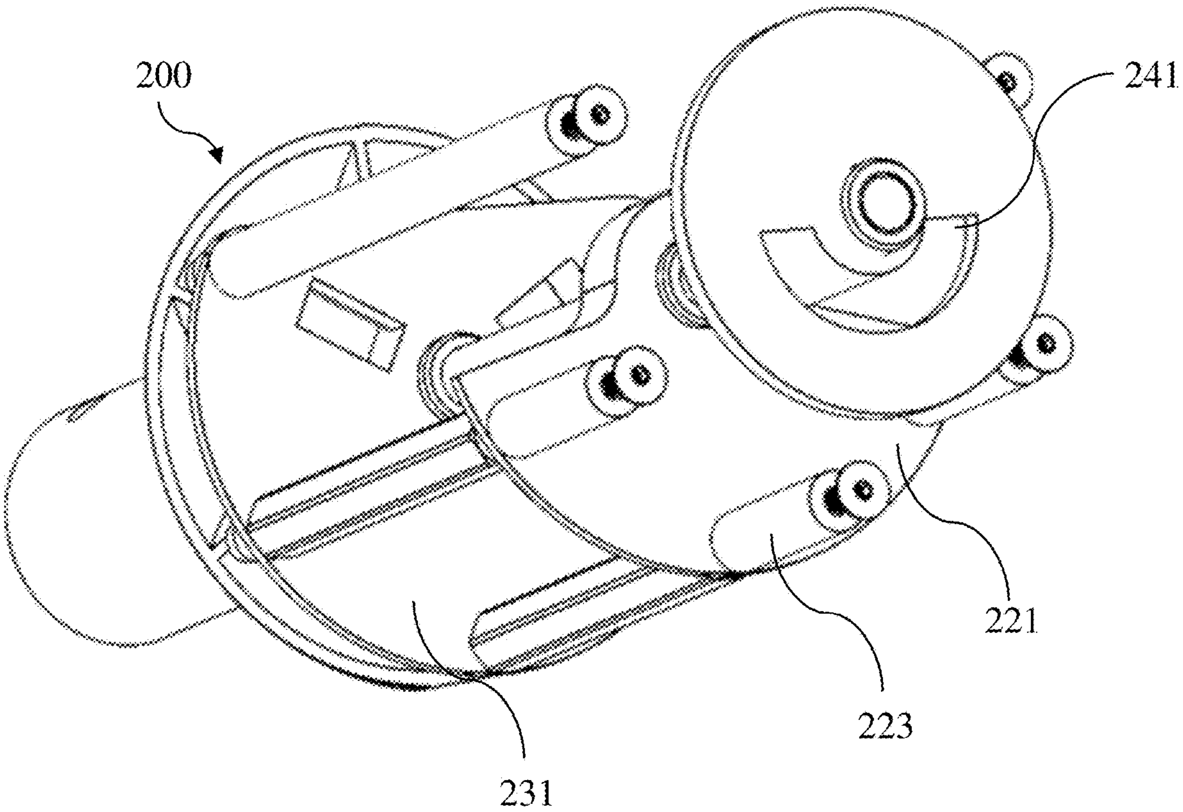
FIG. 13 provides a schematic, perspective view illustration of a portion of a non-limiting metering hopper comprising a feed slot beneath a shield, according to some embodiments.

FIG. 13 provides a schematic, perspective view illustration of a portion of a metering hopper 200, where bowl 247 and feed slot cover 243 have been hidden to reveal feed slot 241 itself. FIG. 13 shows the lateral alignment of feed slot 241 with shield 221 and cover plate 213, illustrating how shield 221 and the cover plate can block the direct fall of solid material onto feed slot 241 while preferentially directing flow of solid material to the side of metering hopper 200 opposite feed slot 241.

Figure 14:
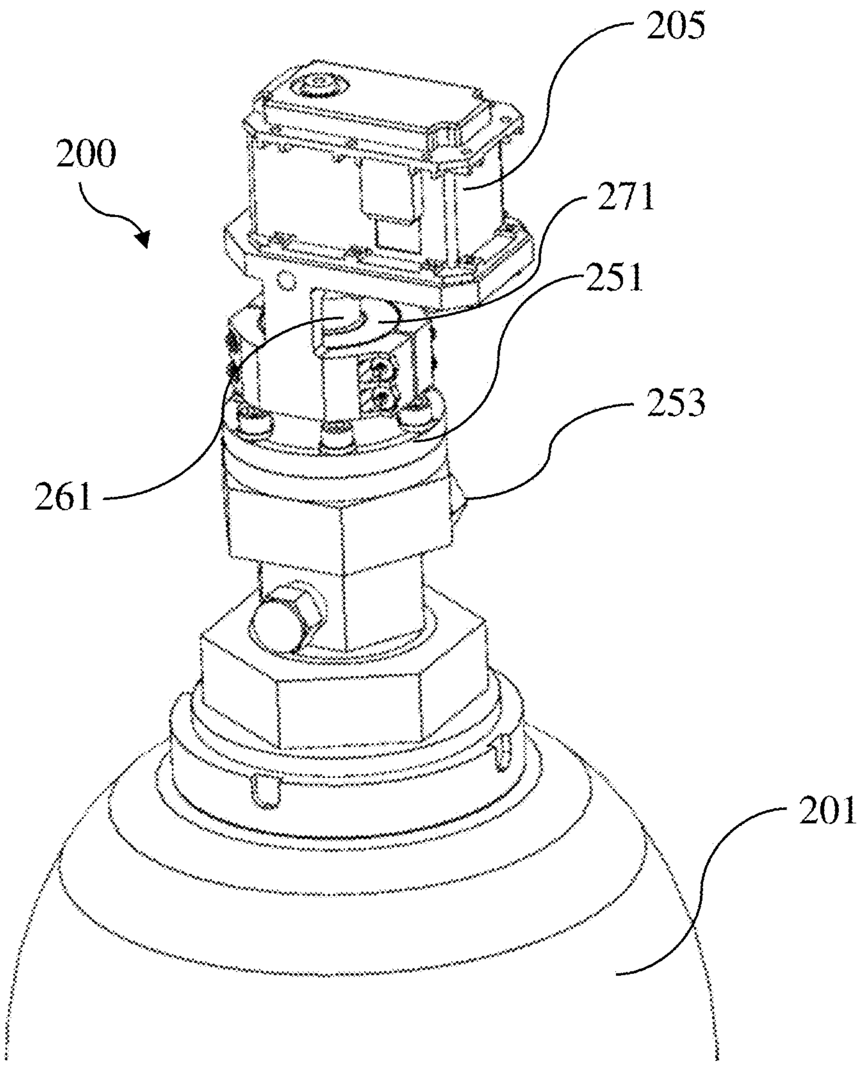
FIG. 14 provides a schematic, perspective view illustration of a non-limiting metering hopper comprising an actuator configured to rotate a valve, according to some embodiments.

FIG. 14 provides a schematic, perspective view illustration of the top of metering hopper 200, showing how actuator 205 connects to the drive shaft passing through hopper 201. In the depicted embodiment, actuator 205 is coupled to an upper shaft 261 that passes into hopper 201 where it is coupled with drive shaft 211 (not visible). It should, of course, be understood that multiple shafts are not generally necessary, as metering hopper 200 could be operated using only a single drive shaft (or using another actuator, as detailed above). However, the use of multiple shafts as depicted in metering hopper 200 may be convenient for assembly of metering hopper 200, according to some embodiments.

The upper shaft sits in a cover 271 connected to hopper 205 via a flange 251. As later figures illustrate more clearly, the cover may be configured to stop upper shaft 261 and/or the drive shaft 211 from thrusting out of metering hopper 200, e.g., as a result of a pressure differential between the inside of hopper 201 (represented as a tank to illustrate that in can be pressurized) and an external environment. For example, cover 271 is fastened to tank 201 by flange 251, and is configured to counteract the thrust of upper shaft 261 on cover 251 by pulling on the connection maintained at flange 251, thereby transferring the force of upper shaft 261 to upper portion 281.

Below flange 251 a valve 253 may be fluidically connected to the interior of hopper 201. In embodiments where hopper 201 is pressurized (e.g., where hopper 201 is connected to a reactor configured to run a gas-generating reaction such as a hydrogen reactor), valve 253 may be a release valve configured to vent if hopper 201 reaches exceeds a desired threshold pressure. Alternatively, in some embodiments, valve 253 may be user operated. For example, in some embodiments, valve 253 could be connected to a fluidic system so that metering hopper 200 (and optionally a reactor connected thereto) can act as a gas source (e.g., as a source of hydrogen gas).

Figure 15:
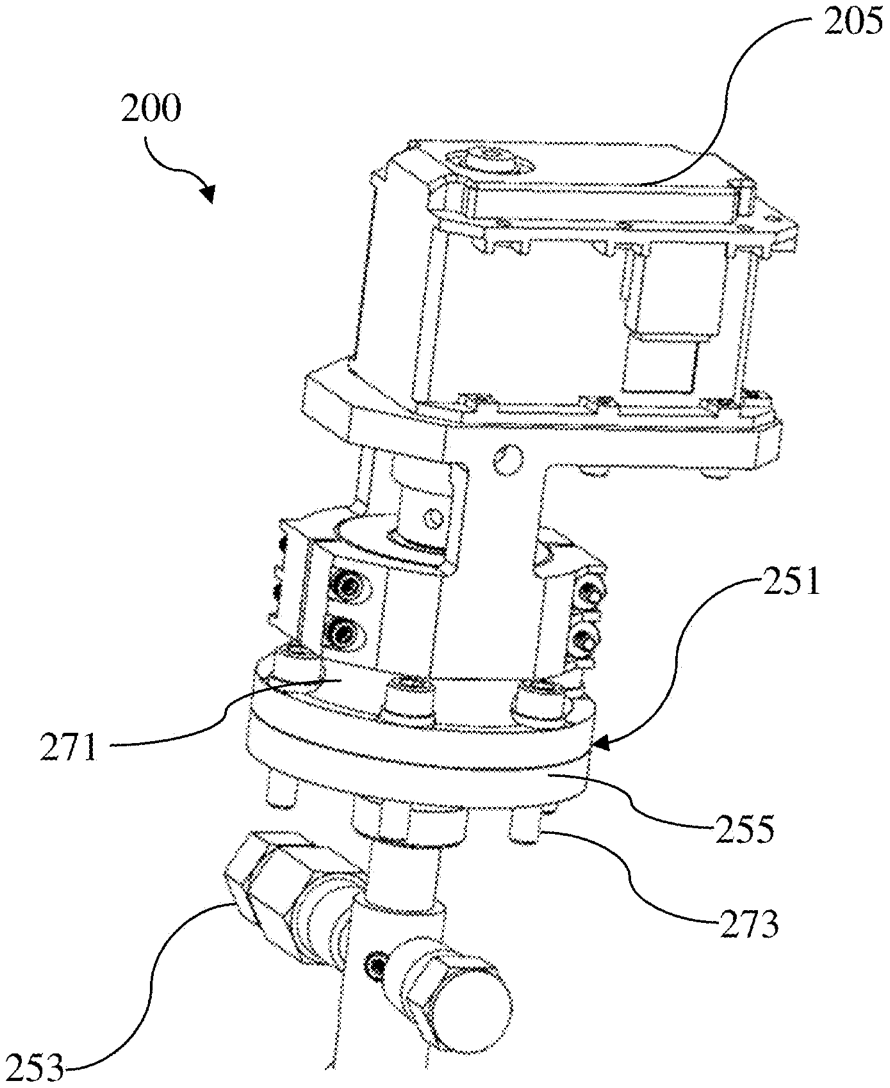
FIG. 15 provides a schematic, perspective view illustration of a non-limiting metering hopper comprising an actuator configured to rotate a valve, according to some embodiments.

FIG. 15 provides a schematic, perspective view illustration of metering hopper 200 from another angle, where hopper 201 is hidden from view to reveal the bottom of flange 251 and a clearer view of valve 253. As shown, flange 251 connects cover 271 to bottom portion 255 of flange 251 using fasteners 273. Any of a variety of kinds or numbers of fasteners may be used to connect the cover to the bottom flange portion. For example, while the depicted fasteners are bolts, the flange could instead be fastened using screws, anchors, ties, or any of a variety of other suitable fasteners, depending on the embodiment. The use of fasteners may, in embodiments, help with disassembly of metering hopper 200 (e.g., to add new solid material and/or perform repairs). It should, of course, be understood that the cover could also be connected to the tank without fasteners or a flange. For example, the cover could be welded to the tank, in some embodiments, as the disclosure is not so limited.

Figure 16:
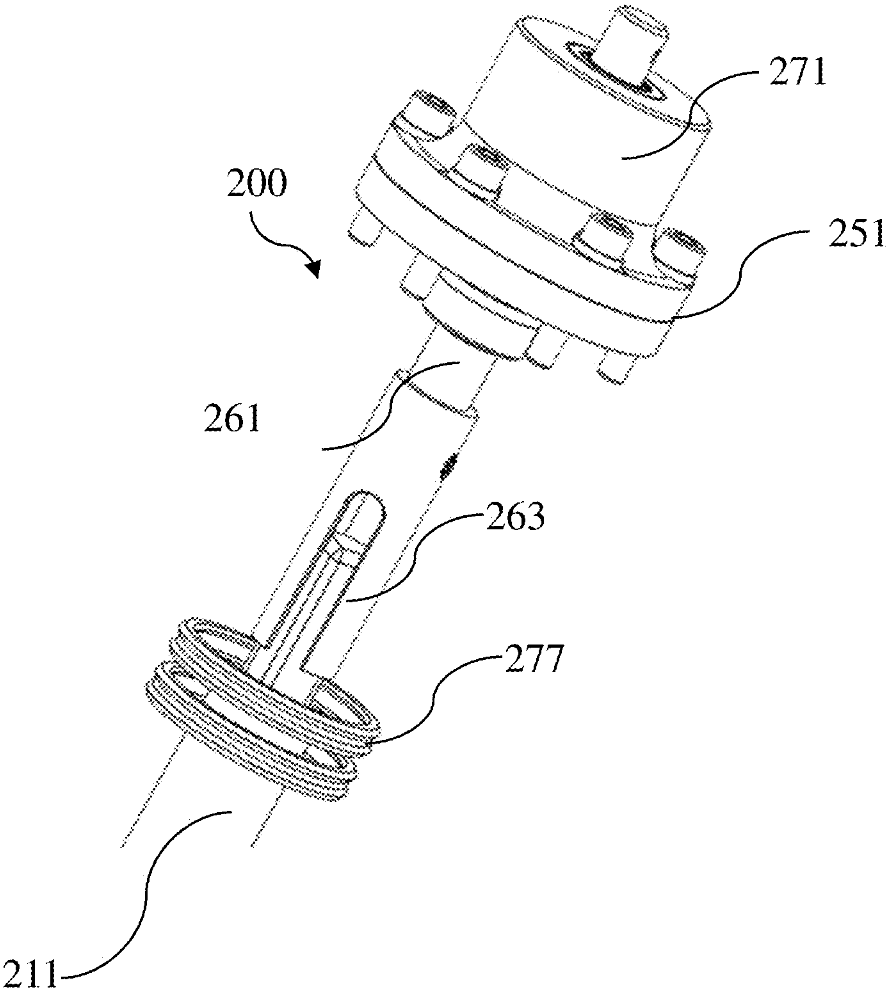
FIG. 16 provides a schematic, perspective view illustration of a drive shaft coupling of a non-limiting metering hopper, according to some embodiments.

FIG. 16 provides a schematic, perspective view illustration of how upper shaft 261 of metering hopper 200 extends past flange 251 in order to couple with drive shaft 211, according to some embodiments. In FIG. 16, upper shaft 261 is coupled to lower shaft 211 using a coupling 263 configured to receive both the upper shaft and the lower shaft. However, in some embodiments, upper shaft 261 could be coupled directly to drive shaft 211. For example, drive shaft 211 could terminate in a socket configured to receive a portion of upper shaft 261, or upper shaft 261 could terminate in a socket configured to receive a portion of drive shaft 211, as the disclosure is not limited to any particular kind of coupling. Moreover, as mentioned above, in some embodiments metering hopper 200 does not include an upper shaft. For example, drive shaft 211 could extend upward into cover 271, according to some embodiments, eliminating the need for upper shaft 261.

In some embodiments, metering hopper 200 is gas tight. In order to accomplish this while nonetheless allowing actuation of drive shaft 211 by actuator 205 metering hopper 200 may comprise one or more gas-tight seals (e.g., shaft seals or gland seals). FIG. 16 illustrates two seals 277 in isolation, illustrating how those seals can be arranged around the shaft to permit passage of drive shaft 211 without leaking gas past seals 277. Subsequent illustrations show how the seals fit within metering hopper 200 to retain the gas.

Figure 17:
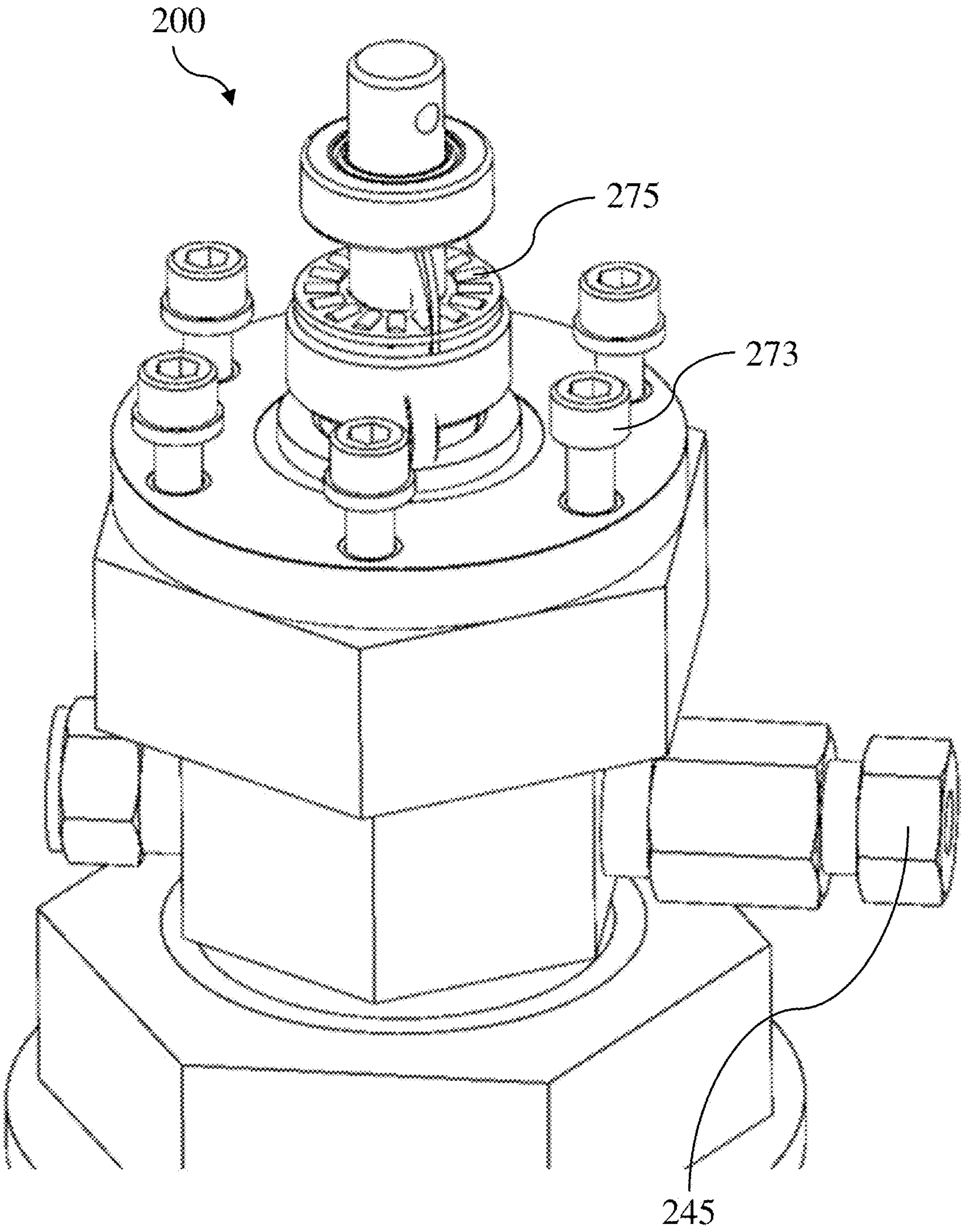
FIG. 17 provides a schematic, perspective view illustration of a portion of a non-limiting metering hopper comprising thrust bearings configured to support the drive shaft when the metering hopper is pressurized, according to some embodiments.

FIG. 17 provides a schematic, perspective view illustration of a portion metering hopper 200, where cover 271 has been removed to reveal thrust bearings 275. As discussed above, drive shaft 211 may experience thrust forces due to the pressure differential associated with a pressurized hopper 201. Thrust may be passed from drive shaft 211 to upper shaft 261 (in embodiments where an upper shaft is used). Thrust bearings 275 are, in some embodiments, configured to transfer thrust from a shaft (e.g., upper shaft 261 or drive shaft 211) to the cover while continuing to permit rotation of drive shaft 211. The thrust bearing may be configured to roll along the cover, for example, in order to transfer the normal force of the thrust to cover 271 without generating a large amount of torque as a result of friction generated by the thrust of drive shaft 211 against cover 271.

Any of a variety of suitable thrust bearings may be used, depending on the embodiment. For example, while thrust bearings 275 are cylindrical bearings, it should, of, course, be understood that other bearing types, such as barrel bearings, ball bearings, or other types of bearings could also be used as thrust bearings, depending on the embodiment.

Figure 18:
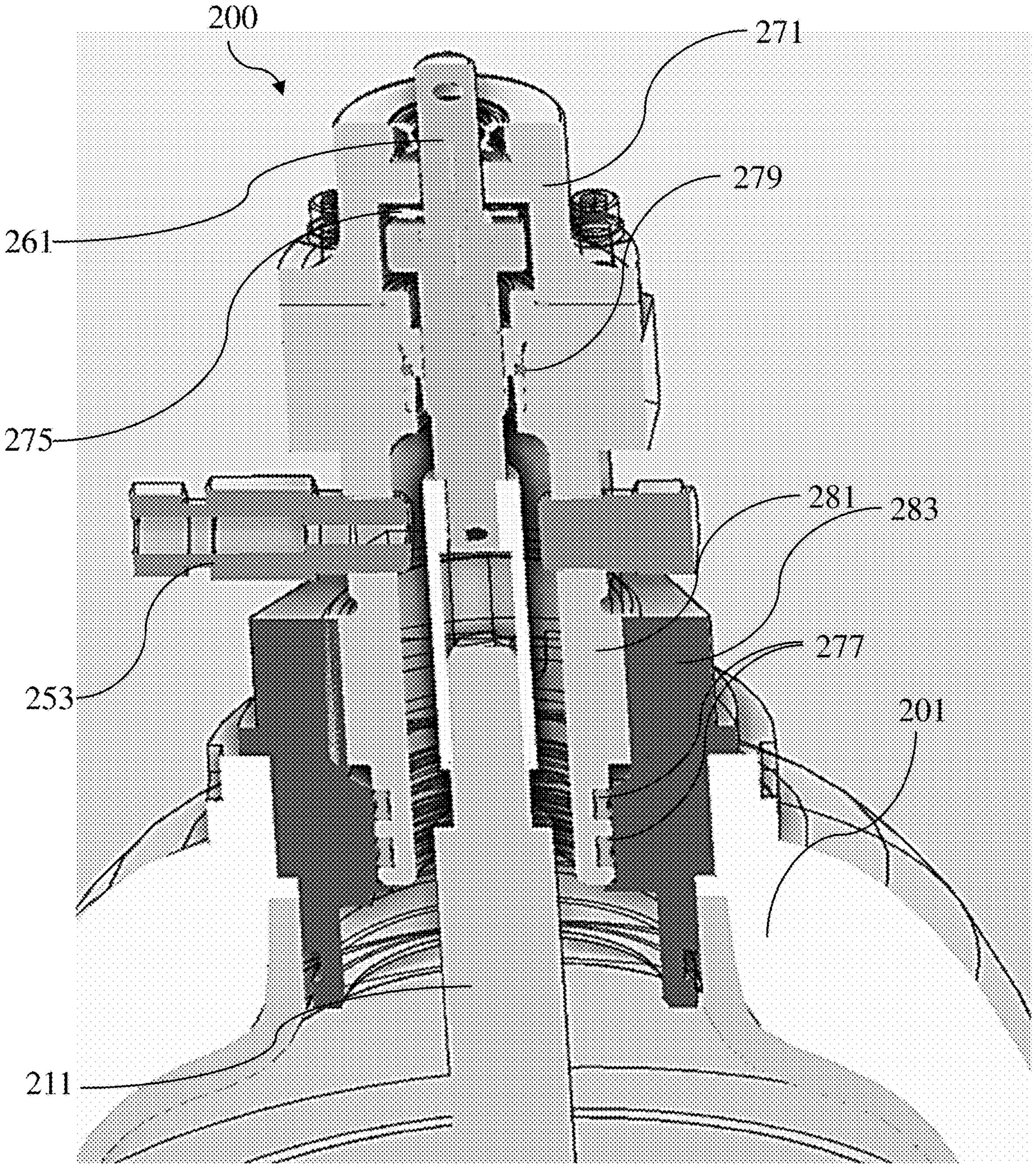
FIG. 18 provides a schematic, cross-sectional view of a non-limiting metering hopper, according to some embodiments.

Finally, FIG. 18 provides a schematic, cross-sectional view of non-limiting metering hopper 200, according to some embodiments, to illustrate passthrough 283 and show how hopper 201 can be sealed while allowing use of an external actuator (not shown). As shown in the cross-section, seals 277 fit between an upper portion 281 of metering hopper 200 and passthrough 283 of hopper 201 to maintain the pressure of hopper 201, while a second, shaft seal 279 prevents gas from leaking around upper shaft 261. Meanwhile valve 253 provides a fluidic connection into upper portion 281 in order to allow hopper 201 to vent through valve 253 when appropriate. FIG. 18 also provides an illustration of how upper shaft 261 presses thrust bearings 275 against cover 271 to transfer the thrust force of the upper shaft to the tank, allowing upper shaft 261 to be turned using a significantly lower torque than would be required without the thrust bearing, and thereby allowing the use of less powerful actuators to crank drive shaft 211.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "cither," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A metering hopper comprising:
- a hopper configured to store solid pellets;
- an outlet disposed in a bottom portion of the metering hopper with respect to local gravity during operation;
- a feed slot configured to gravity-feed the solid pellets to the outlet;
- a feed slot cover including a receiver slot configured to move between a closed configuration where the receiver slot is out of alignment with the feed slot and an open configuration where the receiver slot is aligned with the feed slot;
- a shield configured to block the solid pellets from falling directly into the feed slot; and
- a drive shaft extending through a sealed pass through of the hopper and configured to actuate the feed slot cover between the open configuration and the closed configuration.

2. The metering hopper of claim 1, further comprising a plurality of supports configured to maintain a pose of the shield with respect to the outlet.

3. The metering hopper of claim 2, wherein gaps between adjacent supports of the plurality of supports are sized and shaped to permit the solid pellets to pass through the gaps to the feed slot.

4. The metering hopper of claim 1, wherein a first angle between a first outer portion of the shield closest to the feed slot and the feed slot is less than a second angle between a second outer portion of the shield closest to the receiver slot in the closed configuration and the receiver slot in the closed configuration.

5. The metering hopper of claim 4, wherein the first angle is less than an angle of repose of the solid pellets and the second angle is greater than an angle of repose of the solid pellets.

6. The metering hopper of claim 5, wherein the angle of repose is greater than or equal to 25°.

7. The metering hopper of claim 1, further comprising the solid pellets.

8. The metering hopper of claim 7, wherein the solid pellets comprise a water reactive material.

9. The metering hopper of claim 1, wherein the shield is aligned with a lateral position of the feed slot when the feed slot is positioned vertically below the shield relative to a direction of gravity during operation.

10. The metering hopper of claim 1, wherein the shield is spaced apart from a lateral position of the receiver slot in the open configuration when the feed slot is positioned vertically below the shield relative to a direction of gravity during operation.

11. The metering hopper of claim 1, wherein the metering hopper is a tank configured to be pressurized.

12. The metering hopper of claim 1, further comprising an agitator attached to the drive shaft, wherein rotation of the drive shaft actuates the agitator to agitate the solid pellets, wherein the agitator is conical, and wherein the agitator comprises a spiral flighting disposed on a surface configured to be oriented towards the solid pellets in the metering hopper.

13. A metering hopper comprising:
- a hopper configured to store solid pellets;
- an outlet disposed in a bottom portion of the metering hopper with respect to local gravity during operation;
- a feed slot configured to gravity-feed the solid pellets to the outlet;
- a feed slot cover including a receiver slot configured to move between a closed configuration where the receiver slot is out of alignment with the feed slot and an open configuration where the receiver slot is aligned with the feed slot; and
- a shield configured to block the solid pellets from falling directly into the feed slot; and
- a plurality of supports configured to maintain a pose of the shield with respect to the outlet.

14. The metering hopper of claim 13, wherein gaps between adjacent supports of the plurality of supports are sized and shaped to permit the solid pellets to pass through the gaps to the feed slot.

15. The metering hopper of claim 13, wherein a first angle between a first outer portion of the shield closest to the feed slot and the feed slot is less than a second angle between a second outer portion of the shield closest to the receiver slot in the closed configuration and the receiver slot in the closed configuration.

16. The metering hopper of claim 15, wherein the first angle is less than an angle of repose of the solid pellets and the second angle is greater than an angle of repose of the solid pellets.

17. The metering hopper of claim 13, further comprising the solid pellets, wherein the solid pellets comprise a water reactive material.

18. The metering hopper of claim 13, wherein the shield is aligned with a lateral position of the feed slot when the feed slot is positioned vertically below the shield relative to a direction of gravity during operation.

19. The metering hopper of claim 13, wherein the shield is spaced apart from a lateral position of the receiver slot in the open configuration when the feed slot is positioned vertically below the shield relative to a direction of gravity during operation.

20. The metering hopper of claim 13, wherein the metering hopper is a tank configured to be pressurized.

21. The metering hopper of claim 13, further comprising a drive shaft extending through a sealed pass through of the hopper and configured to actuate feed slot cover between the open configuration and the closed configuration an agitator attached to the drive shaft, wherein rotation of the drive shaft actuates the agitator to agitate the solid pellets, wherein the agitator is conical, and wherein the agitator comprises a spiral flighting disposed on a surface configured to be oriented towards the solid pellets in the metering hopper.

* * * * *